(12) United States Patent
Feick et al.

(10) Patent No.: US 7,513,771 B2
(45) Date of Patent: **\*Apr. 7, 2009**

(54) INJECTION MOLDING COMPONENT WITH LOW PROFILE TERMINAL CONNECTION

(75) Inventors: Murray Feick, Kitchener (CA); Payman Tabassi, Rockwood (CA); Glenn Sterritt, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 203 days.

This patent is subject to a terminal disclaimer.

(21) Appl. No.: 11/563,087

(22) Filed: Nov. 24, 2006

(65) Prior Publication Data
US 2007/0149049 A1    Jun. 28, 2007

Related U.S. Application Data

(63) Continuation-in-part of application No. 11/286,479, filed on Nov. 25, 2005, now Pat. No. 7,462,031.

(51) Int. Cl.
B29C 45/20 (2006.01)
(52) U.S. Cl. ...................................... 425/549
(58) Field of Classification Search .................. 425/549
See application file for complete search history.

(56) References Cited

U.S. PATENT DOCUMENTS

| | | | |
|---|---|---|---|
| 4,613,296 A | 9/1986 | Nagasaka | |
| 4,771,534 A | 9/1988 | Gellert et al. | |
| 4,837,925 A | 6/1989 | Gellert | |
| 5,266,023 A | 11/1993 | Renwick | |
| 5,312,241 A | 5/1994 | Gunther | |
| 5,334,008 A * | 8/1994 | Gellert | 425/549 |
| 5,591,366 A | 1/1997 | Schmidt et al. | |
| 5,704,113 A | 1/1998 | Mak | |
| 6,530,776 B1 | 3/2003 | Pilavdzic et al. | |
| 6,817,088 B1 | 11/2004 | Lin | |
| RE38,920 E | 12/2005 | Gellert | |

(Continued)

FOREIGN PATENT DOCUMENTS

DE        10333206 B4    4/2004

(Continued)

OTHER PUBLICATIONS

Libesh Engineering Works, "Hot Runner System", (Date Unknown), www.libeshengg.com/CoilTubularHeater.asp.

(Continued)

*Primary Examiner*—Tim Heitbrink
(74) *Attorney, Agent, or Firm*—Ridout & Maybee LLP

(57) ABSTRACT

An injection molding hot-runner component comprising a tubular body defining a central passage and having an outer surface, an electrically insulated heater wire coupled to the tubular body, an external lead electrically connected to an end of the heater wire to form a connection, the external lead for connecting to an external power supply, and a terminal housing mounted to the outer surface of the tubular body, the connection of the external lead and the end of the heater wire being located within the terminal housing, wherein the connection extends in a plane that is generally parallel to tangential plane to the outer surface of the tubular body at the location of the connection.

41 Claims, 28 Drawing Sheets

U.S. PATENT DOCUMENTS

| | | |
|---|---|---|
| 7,067,774 B2 | 6/2006 | Hoffmann |
| 2003/0164363 A1 | 9/2003 | Renwick et al. |
| 2005/0147713 A1 | 7/2005 | Hagelstein et al. |
| 2005/0226956 A1 | 10/2005 | Fischer et al. |
| 2007/0077821 A1 | 4/2007 | Pilavdzic |
| 2007/0084850 A1 | 4/2007 | Pilavdzic |
| 2007/0086759 A1 | 4/2007 | Russegger et al. |

FOREIGN PATENT DOCUMENTS

| | | |
|---|---|---|
| EP | 0765728 A2 | 4/1997 |
| WO | 2005053361 A2 | 6/2005 |
| WO | 2005053361 A3 | 6/2005 |
| WO | 2007006899 A1 | 1/2007 |
| WO | 2007036017 A1 | 4/2007 |

OTHER PUBLICATIONS

International Search Report and Written Opinion of the International Searching Authority, issued Mar. 19, 2007 in connection with PCT Application No. PCT/CA2006/001928.

"Runnerless Injection Molding Equipment Brochure", Osco Inc. (Apr. 1, 1983).

"Runnerless Molding Systems", Osco Inc., (Jan. 1, 1997).

"Runnerless Molding Systems Brochure", Osco Inc. (Jan. 1, 2003).

* cited by examiner

INJECTION MOLDING COMPONENT WITH LOW PROFILE TERMINAL CONNECTION

RELATED APPLICATIONS

This application is a continuation-in-part of and claims priority to and the benefit of U.S. patent application Ser. No. 11/286,479, filed Nov. 25, 2005.

FIELD OF THE INVENTION

This invention relates generally to injection molding apparatus and more particularly to an injection molding nozzles and components having a terminal connection of an electrically conductive element.

BACKGROUND OF THE INVENTION

An injection molding nozzle having a terminal of a conductive electrical wire, such as an embedded electrical heating element, is well known in the art. In such nozzle, the heating element is embedded in the nozzle body and includes a small diameter resistance wire which connects to a larger diameter conductor to provide a terminal to which an external electrical lead is connected. The terminal is housed in a terminal housing located in a rearward portion of the nozzle and which extends radially outwardly from the nozzle body. The terminal housing is therefore prone to damage during assembly and disassembly of the injection molding nozzle within the mold manifold. Moreover, to accommodate the profile of the nozzle, it is usually necessary to machine an opening or receiver in the mold manifold in which the terminal housing can be seated. The opening or receiver is typically required to be machined to strict tolerances, which adds to manufacturing costs. During assembly, the nozzle typically must be oriented in a specific manner such that the terminal housing can be seated in the opening or receiver. This reduces ease of assembly.

Accordingly, there is a need for a nozzle that alleviates, at least partially, one or more of the above difficulties.

SUMMARY OF THE INVENTION

According to one example embodiment is an injection molding hot-runner component comprising a tubular body defining a central passage and having an outer surface, an electrically insulated heater wire coupled to the tubular body, an external lead electrically connected to an end of the heater wire to form a connection, the external lead for connecting to an external power supply, and a terminal housing mounted to the outer surface of the tubular body, the connection of the external lead and the end of the heater wire being located within the terminal housing, wherein the connection extends in a plane that is generally parallel to tangential plane to the outer surface of the tubular body at the location of the connection.

According to another example embodiment is an injection molding hot-runner nozzle component comprising a tubular body defining a central passage and having an outer surface; an electrically insulated heater wire coupled to the tubular body; an external lead for connecting to an external power supply, the external lead having a lead end connected to an end of the heater wire; and an insulating terminal housing tangentially mounted to the outer surface of the tubular body, the connection of the lead end and the end of the heater wire being located within the terminal housing.

BRIEF DESCRIPTION OF THE DRAWINGS

To facilitate a better understanding of the invention, embodiments of the invention will now be described with reference to the drawings. The drawings are not to scale.

DETAILED DESCRIPTION OF THE INVENTION

Figure 1:
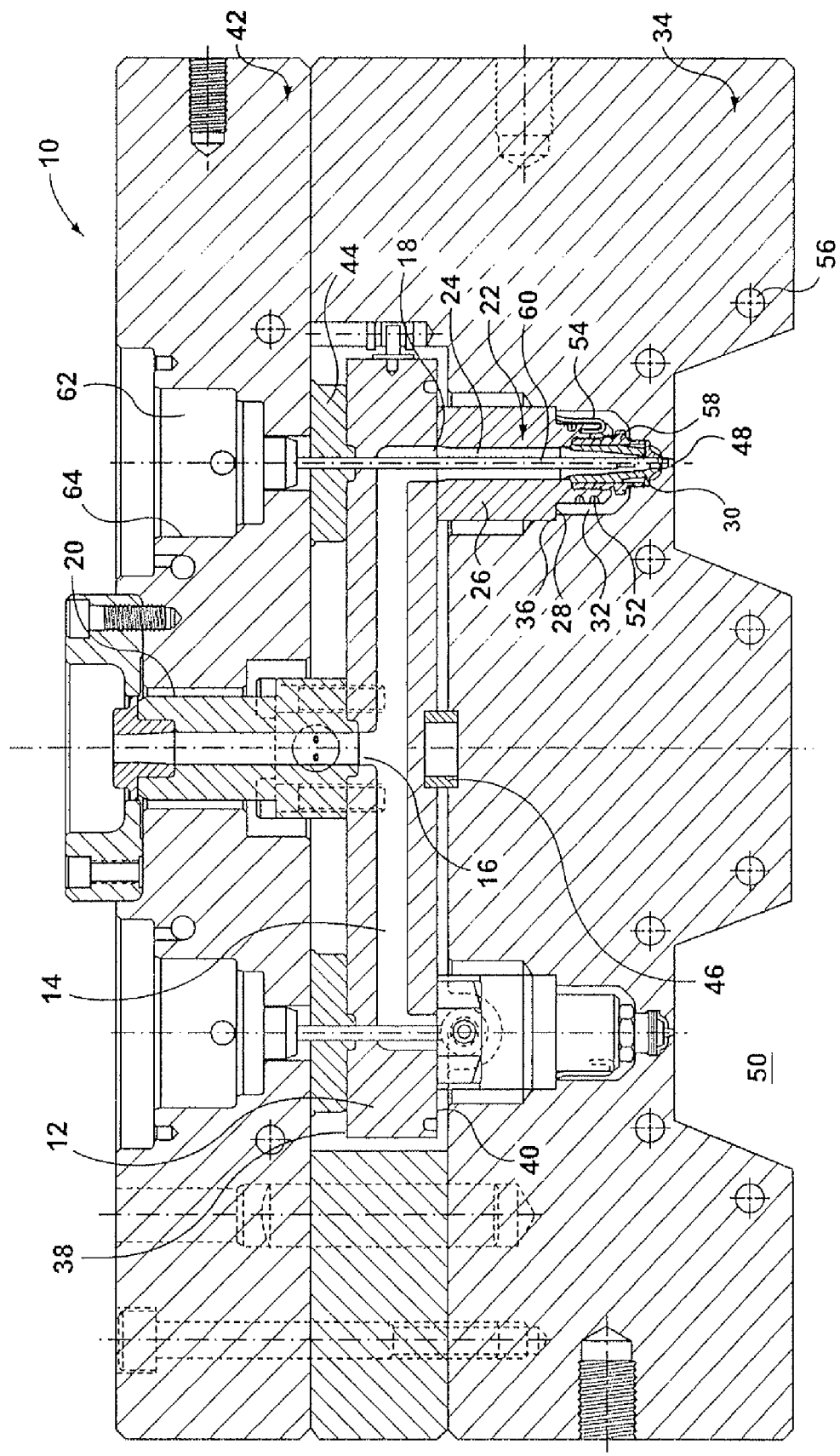
FIG. 1 is a partial sectional view of a prior art injection molding apparatus.

The present invention relates to, among other things, nozzles and components thereof which can be used in injection molding apparatus such as the apparatus 10 shown in FIG. 1. Injection molding apparatus 10 includes a manifold 12 having a manifold melt channel 14. Manifold melt channel 14 extends from an inlet 16 to manifold outlets 18. Inlet 16 of manifold melt channel 14 receives a melt stream of moldable material from a machine nozzle (not shown) through a sprue bushing 20 and delivers the melt to hot runner nozzles 22, which are in fluid communication with respective manifold outlets 18. Although a pair of hot runner nozzles 22 is shown in FIG. 1, it will be appreciated that a typical injection molding apparatus may include only one or a plurality of hot runner nozzles for receiving melt from respective manifold outlets.

Each hot runner nozzle 22 is received in an opening 32 in a mold plate 34. A nozzle head 26 of the hot runner nozzle 22 includes lower surface 28. The lower surface 28 abuts a step 36, which is provided in opening 32 to maintain nozzle head 26 in abutment with a lower surface 40 of manifold 12. A nozzle tip 30 is received in a downstream end of hot runner nozzle 22. The nozzle tip 30 is coupled to the hot runner nozzle 22 by a transfer seal 58. The transfer seal 58 is threaded to the hot runner nozzle 22. A nozzle melt channel 24 extends through hot runner nozzle 22 and nozzle tip 30. Nozzle melt channel 24 is in communication with manifold outlet 18 to receive melt from manifold channel 14. Hot runner nozzle 22 is heated by a heater 52 and further includes a thermocouple 54.

A valve pin 60 extends through nozzle melt channel 24 and is slidable through a valve pin bushing 44, which is provided between manifold 12 and back plate 42. The valve pin 60 is axially movable by an actuator 62 to selectively engage a mold gate 48. The actuator 62 is received in an opening 64 in back plate 42 and may be hydraulic, pneumatic or any other suitable type. A locating ring 46 maintains manifold 12 in position relative to mold plate 34.

Mold cavities 50 are provided between mold plate 34 and a mold core (not shown). Mold cavities 50 receive melt from nozzle melt channels 24 through mold gates 48. Cooling channels 56 extend through mold plate 34 to cool the mold cavities 50. In operation, melt is injected from the machine nozzle into manifold channel 14 of manifold 12 through sprue bushing 20. Nozzle melt channels 24 of nozzles 22 receive melt from manifold outlets 18 and deliver the melt to mold cavities 50 through the mold gates 48. Once the mold cavities 50 have been filled with melt, the melt is cooled and the molded parts are ejected from injection molding apparatus 10.

Figure 2:
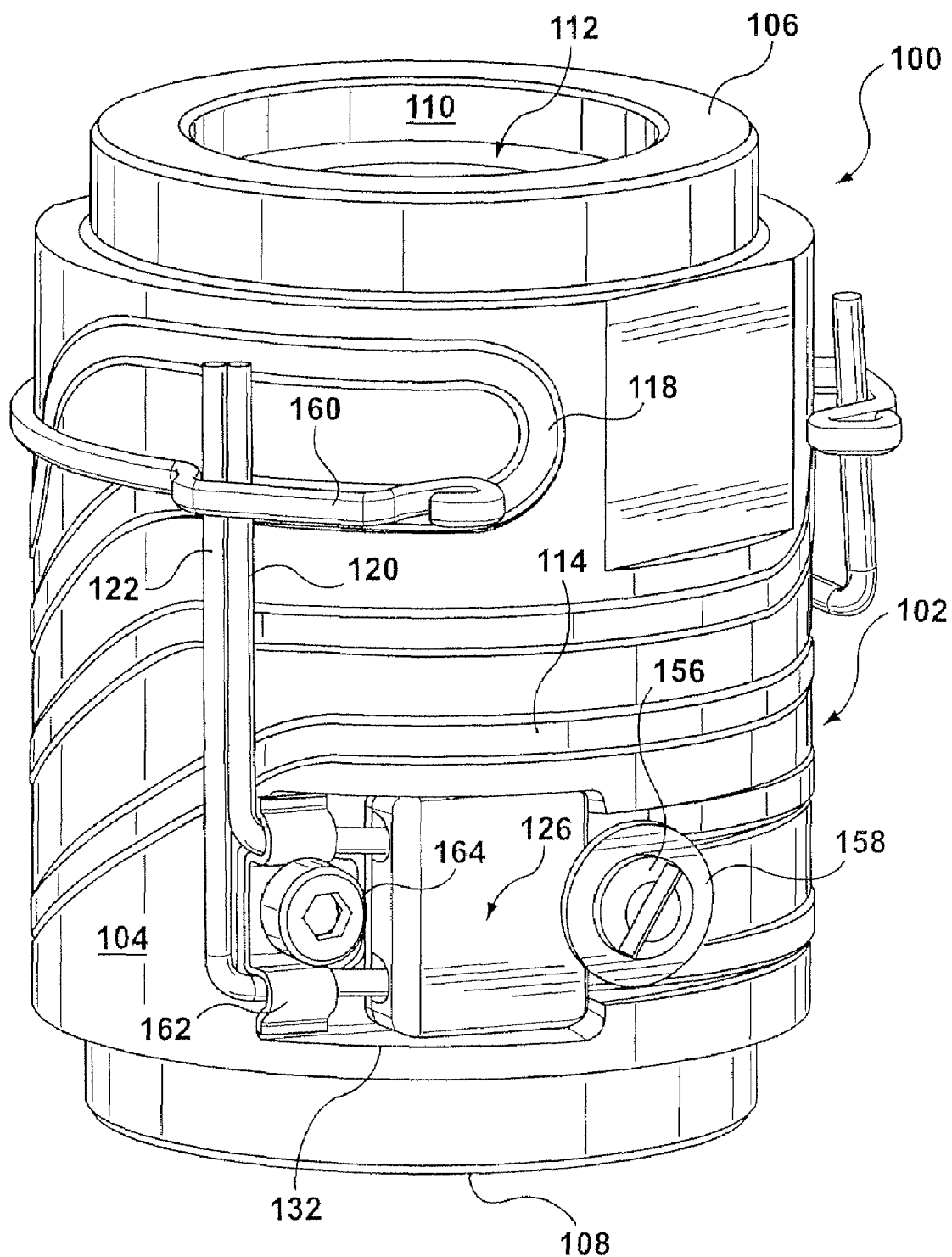
FIG. 2 is an isometric view of an injection molding nozzle segment according to one embodiment of the invention, having a recessed terminal housing, which can be used in the apparatus of FIG. 1.

Embodiments of the invention will now be described with reference to FIGS. 2 to 30. Referring primarily to FIG. 2, but with reference also to FIG. 3, an injection molding nozzle segment according to one embodiment of the invention is shown and designated generally by reference numeral 100. The nozzle segment 100 is a modular component of an injection molding nozzle to be formed therewith and has a cylindrical nozzle body designated generally by reference numeral 102 having an outer surface 104, first and second opposed ends 106, 108 and an inner surface 110 defining a central melt channel 112 extending between the ends 106, 108. As can be seen in FIG. 2, the nozzle body 102 is journaled at both ends to facilitate connection to other nozzle body segments and/or other parts of an injection molding nozzle.

The injection molding nozzle segment 100 further includes an electrically conductive element in the form of a heater 114 coupled to, e.g. embedded in, the outer surface 104 and extending in a spiral configuration as is known in the art. The heater 114 comprises a conductive electrical wire, e.g. a resistance heater wire 116, surrounded by electrical insulation and a sheath over the insulation as is known in the art. The resistance heater wire 116 has a portion 118 formed into a U-shaped bend and two opposite ends which are electrically coupled to ends of electrical wires of two respective external lead elements or leads 120, 122 at a terminal designated generally by reference numeral 124 housed in a terminal housing 126. The ends of the resistance heater wire 116 are crimped to the ends of the wires of the leads 120, 122 with the use of metal crimping tubes 128, 130.

Figure 3:
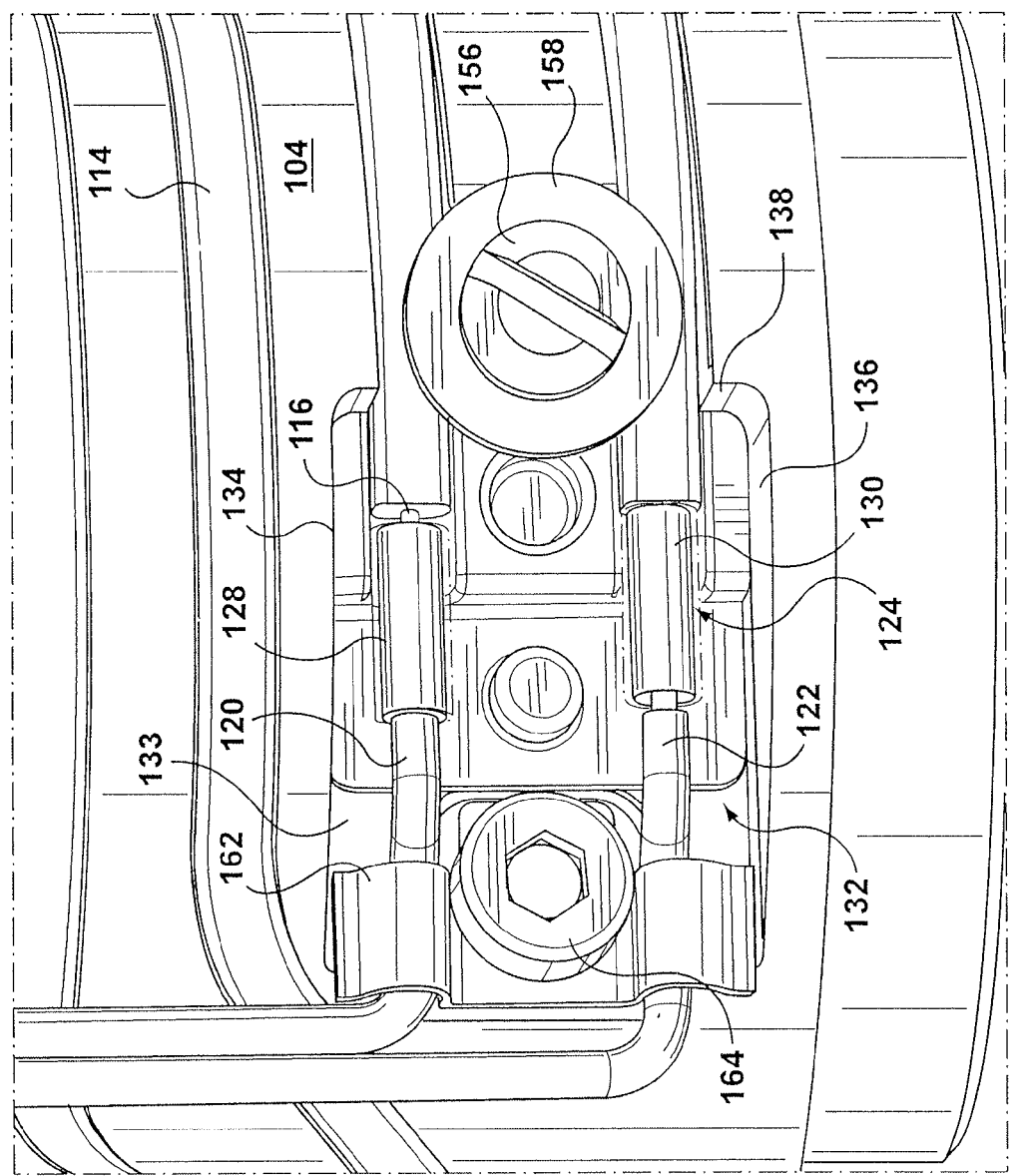
FIG. 3 is an enlarged view of a portion of FIG. 2 showing the recessed terminal housing with an outer terminal housing member thereof removed to show internal structure.

As can be seen best with reference to FIG. 3 (in which an outer housing member of the terminal housing 126 has been removed to show internal structure), the outer surface 104 of the nozzle body 102 is recessed to define a seat designated generally by reference numeral 132 for the terminal housing 126. The seat 132 has a bottom wall 133 and three radially-extending side walls, namely two spaced parallel side walls 134, 136 and a third wall 138 connecting the parallel side walls 134, 136. The third wall 138 is provided with two openings through which ends of the heater 114 extend in parallel into the seat 132 in a direction that is either generally tangential to the outer surface 104 or in a direction that is generally parallel to the tangential direction.

Similarly, the leads 120, 122 extend generally tangentially to the outer surface 104 (or in a plane that is generally parallel to the tangential plane to the outer surface 104) into the terminal housing 126 to assist in reducing the radial profile of the nozzle segment 100. This is facilitated by guide or retainer components that will be described further below.

Figure 4:
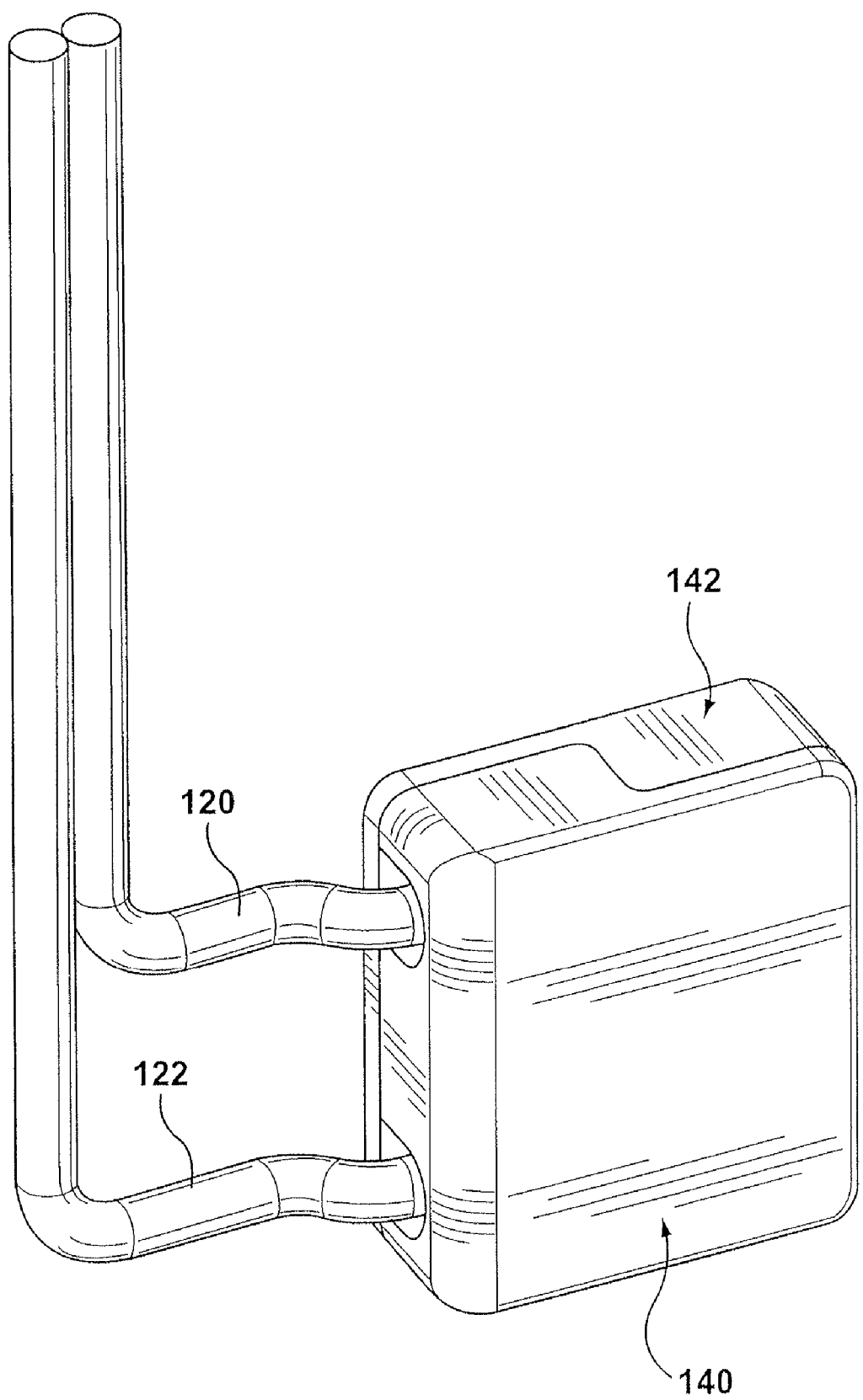
FIG. 4 is an isometric view of the terminal housing of the injection molding nozzle segment of FIG. 2 shown in an assembled condition.
Figure 5:
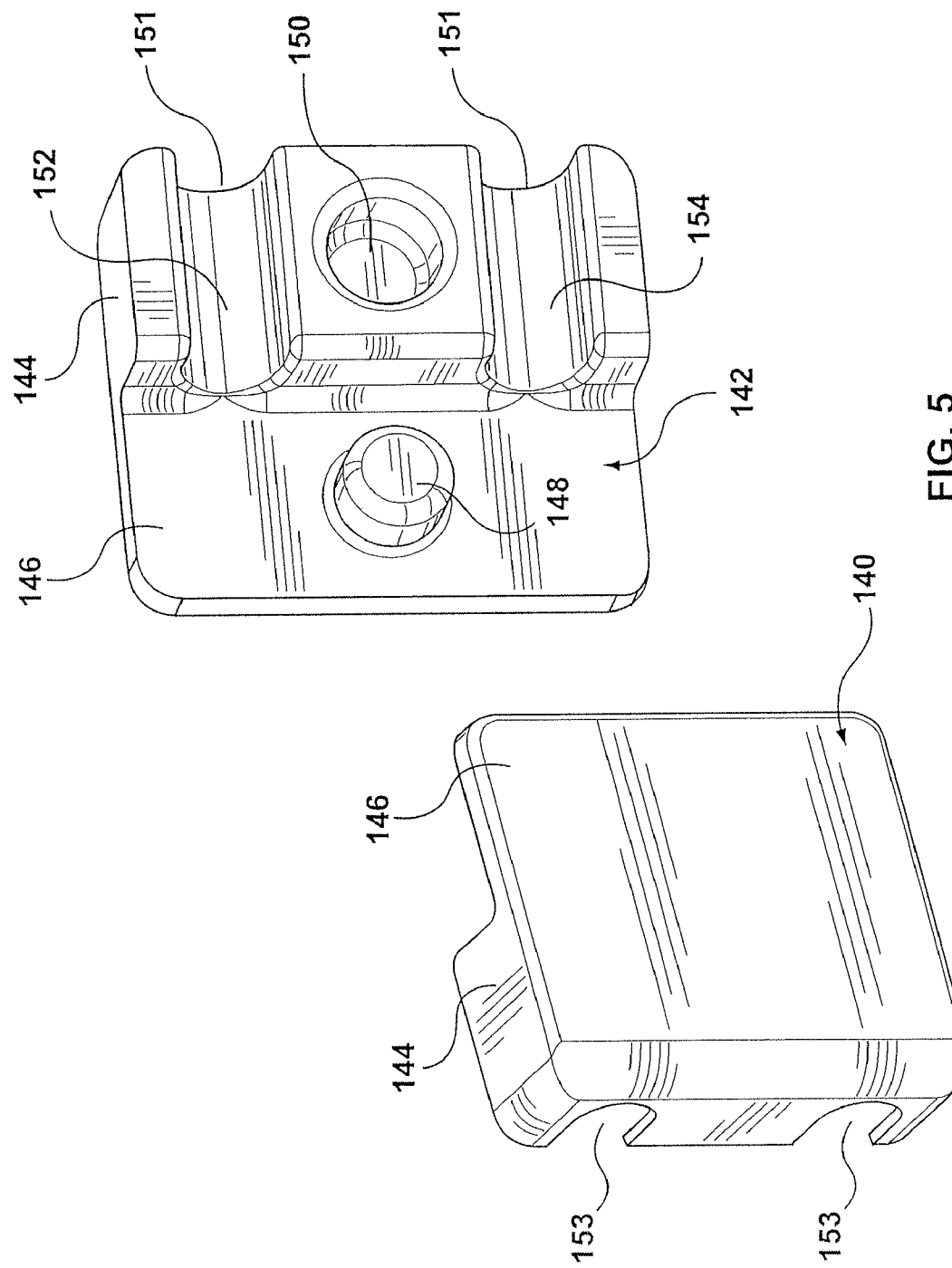
FIG. 5 is an isometric view of the terminal housing of the injection molding nozzle segment of FIG. 2, shown in an unassembled or exploded condition.

As can be seen best with reference to FIGS. 4 and 5, the terminal housing 126 comprises of two mutually complementary and identical terminal housing members designated generally by reference numerals 140, 142 secured together one on either side of the terminal 124. Each terminal housing member 140, 142 has a thick half 144 and a thin half 146. The thin half 146 defines a male protrusion 148 while the thick half 144 defines a female receiver 150 which mates with the male protrusion 148 of the other housing member. The thick half 144 of each terminal housing member 140, 142 also defines a pair of channels 152, 154 extending between openings 151, 153 in the terminal housing 126 for receiving the electrical elements within the terminal housing 126. The terminal housing members 140, 142 are secured together and to the nozzle body 102 by a fastener in the form of a set screw 156 and washer 158 as can be seen best with reference to FIG. 2. The set screw 156 is screwed radially into the nozzle body 102 and causes the washer 158 to engage and clamp the terminal housing 126 to the seat 132.

To assemble an injection molding nozzle having the presently described injection molding nozzle segment 100 in an injection molding apparatus, the nozzle segment 100 is first assembled into an injection molding nozzle by adding other components as are known in the art. The resistance heater wire ends 116 of the heater 114 are then crimped to the ends of the wires of the leads 120, 122 to form the terminal 124. Then, the terminal housing members 140, 142 are assembled one on either side of the terminal 124 and attached to the seat 132 using the set screw and washer 156, 158. The leads 120, 122 lead to an external controller (not shown) which controls the energizing of the heater 114 of the nozzle. As can be seen with reference to FIG. 2, the leads 120, 122 are guided along the length of the nozzle segment 100 using an arcuate metal retaining clip 160. During assembly of the nozzle within the manifold of an injection molding apparatus, the leads 120, 122 may be pulled thereby putting stress on the terminal 124. To reduce this stress, which may impair the connection between the wires of the leads 120, 122 and ends of the resistance heater wire 116 of the heater 114, a stress relief member 162 in the form of a bent rectangular metal strip 162 is employed. The strip 162 has a central opening (not shown) and end portions bent to provide retainers for the leads 120, 122. With end portions of the leads 120, 122 held in the retainers, the stress relief member 162 is fastened to the nozzle body 102 using a hex bolt 164 screwed radially into the nozzle body 102. Thus, pulling on the leads 120, 122 during assembly of the nozzle within the mold manifold will minimize stress on the terminal 124 that may lead to a loose electrical connection. Moreover, this arrangement causes end portions of the leads to lie against the bottom wall 133 of the seat 132 so that they extend generally tangentially to the outer surface 104 (or in a plane that is generally parallel to the tangential plane to the outer surface 104) into the terminal housing 126 to minimize the radial profile of the nozzle segment 100.

FIGS. 6 to 9 illustrate a nozzle segment designated generally by reference numeral 200 according to another embodiment of the invention. In the description of this embodiment, like reference numerals in the 200 series are used to describe like parts for ease of understanding. Only differing features and aspects of the present embodiment are described in detail. For similar parts, reference can be made to above description. The features and aspects described for previous embodiments can be used accordingly with the present embodiment.

Figure 6:
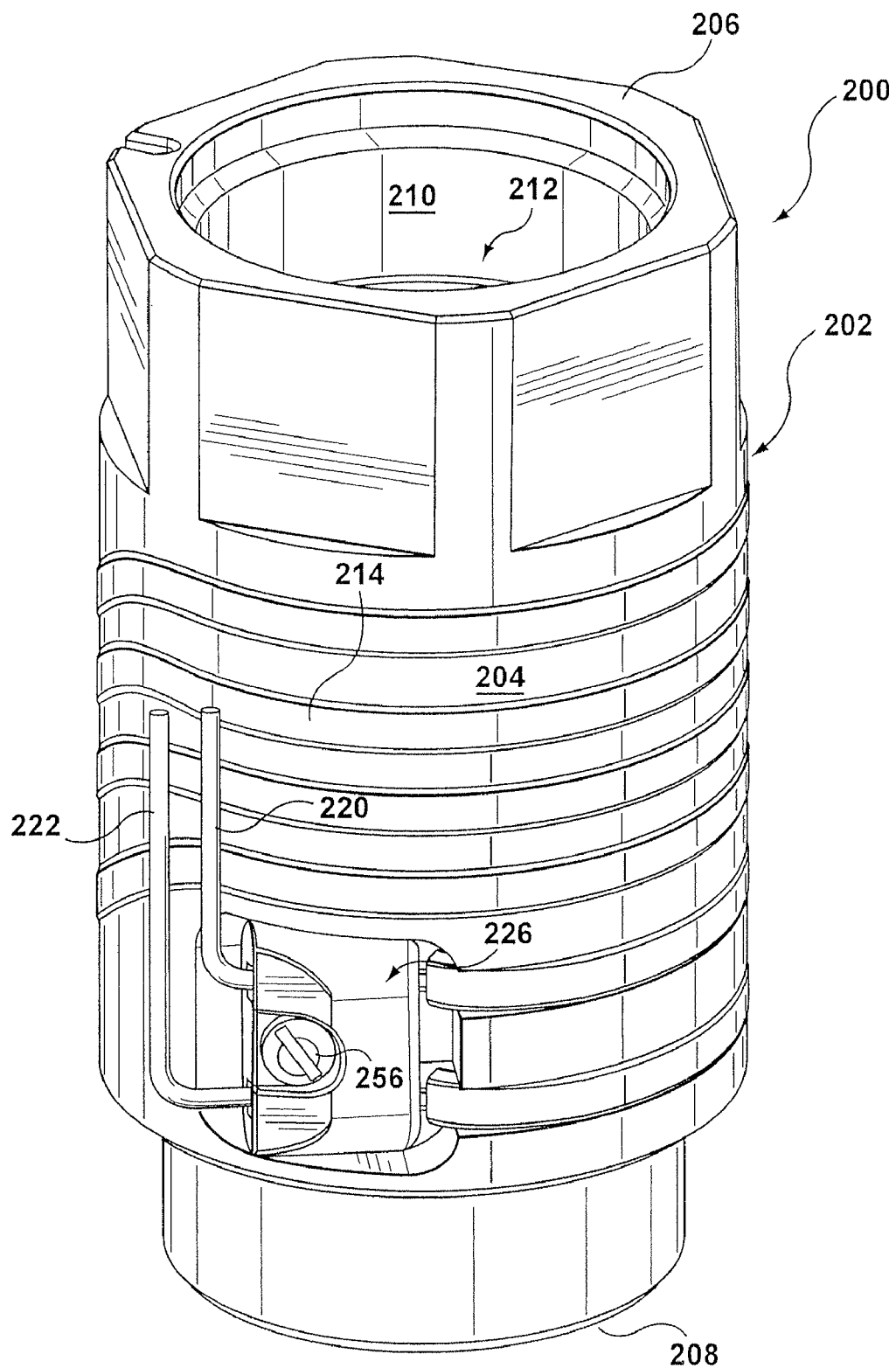
FIG. 6 is an isometric view of an injection molding nozzle segment according to another embodiment of the invention, having a different nozzle body and recessed terminal housing as compared to those shown in FIG. 2, which can be used in the apparatus of FIG. 1.
Figure 7:
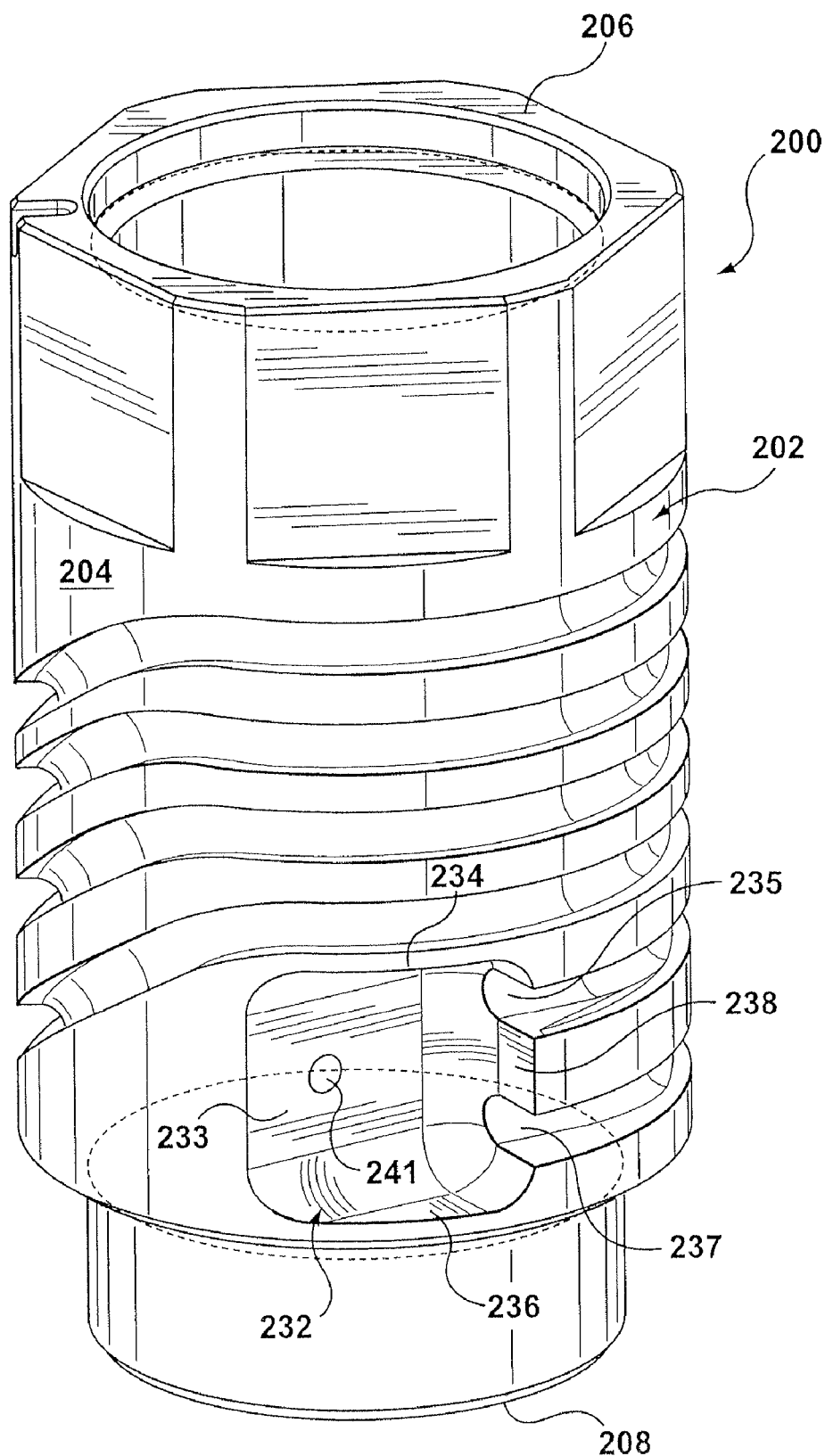
FIG. 7 is an isometric view of a nozzle body of the injection molding nozzle segment of FIG. 6.

Referring to FIGS. 6 and 7, the nozzle segment 200 is similar to the nozzle segment 100 except that it has a nozzle body 202 and heater 214 of a different shape and configuration, as shown. The nozzle body 202 has one end 206 journaled in the shape of a hexagon and an opposite end 208 journaled in the shape of a circle. Like the first embodiment, the heater 214 has a portion bent into a "U" shape (not shown). Furthermore, the nozzle segment 200 has an outer surface 204 that is recessed to define a seat 232 having a bottom wall 233 and three radially-extending side walls, namely two spaced parallel side walls 234, 236 and a third wall 238 connecting the parallel side walls 234, 236. The third wall 238 is provided with two openings 235, 237 through which ends of the heater 214 extend in parallel into the seat 232 and a terminal housing 226 in a direction that is generally tangential to the outer surface 204 (or in a plane that is generally parallel to the tangential plane to the outer surface). Similarly, leads 220, 222 extend in a direction generally tangential to the outer surface 204 into the terminal housing 226 and seat 232 to maintain the low radial profile of the nozzle segment 200.

Figure 9:
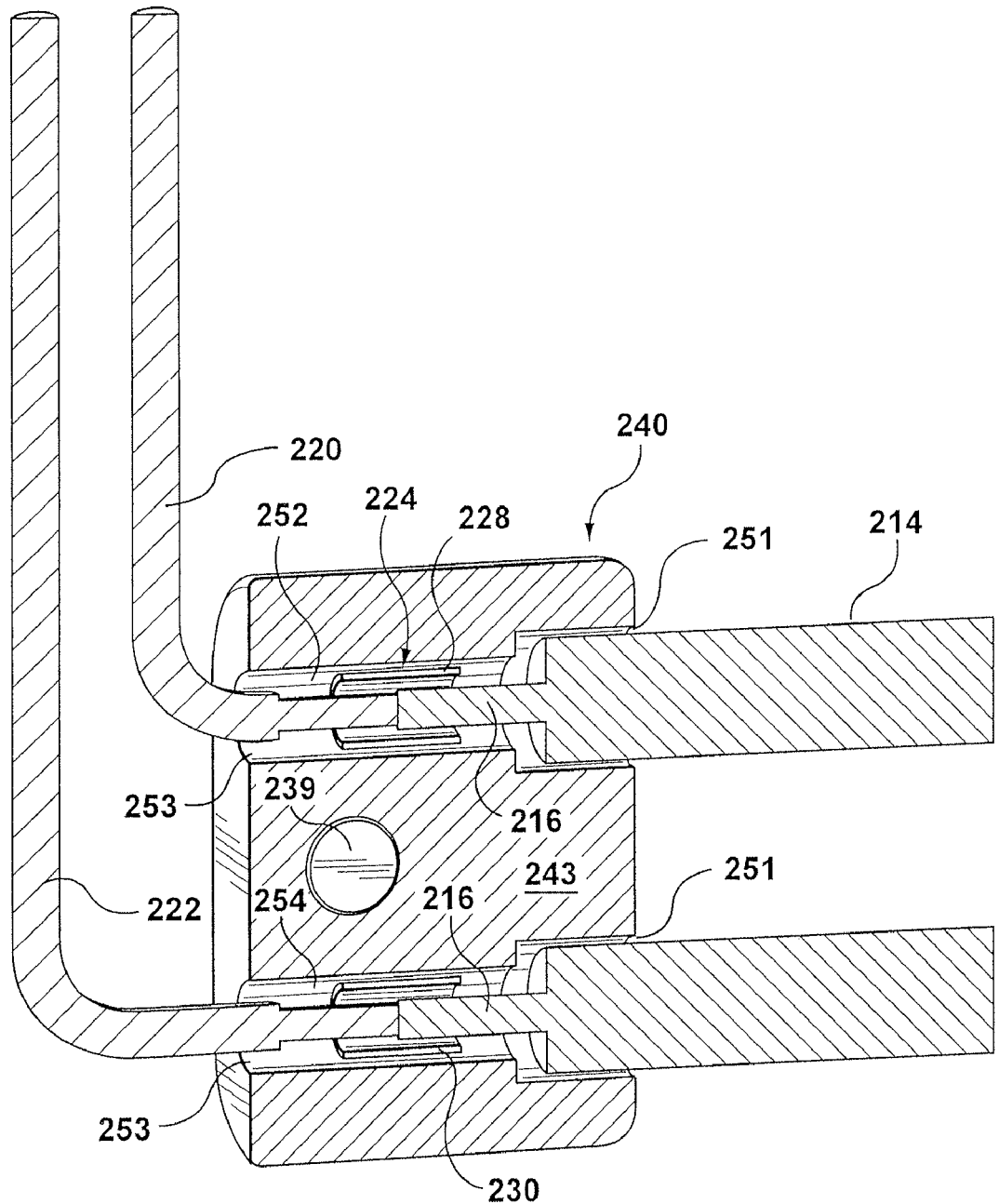
FIG. 9 is an isometric view of the terminal housing of the injection molding nozzle segment of FIG. 6 with an outer terminal housing member removed to show internal structure.

As can be seen best with reference to FIG. 9, the terminal housing 226 comprises two mutually complementary and identical terminal housing members with only one of the members being shown and designated generally by reference numeral 240. The terminal housing members 240 have a different shape and configuration as compared to the terminal housing members 140, 142 of the first described embodiment, as shown. Each terminal housing member 240 has a planar interior surface 243 which lies flush against the planar interior surface 243 of the other terminal housing member 240, when the housing members 240 are secured together. Sandwiched between the terminal housing numbers 240 is a terminal designated generally by reference numeral 224 at which the ends of a resistance heater wire 216 of the heater 214 are crimped to ends of wires of the leads 220, 222 using metal crimping tubes 228, 230. To accommodate the terminal 224, heater 214, and leads 220, 222, the planar interior surfaces of the housing members 240 are recessed to define complementary channels 252, 254 extending between pairs of opposite end openings 251, 253. The terminal housing members 240 are secured together and to the nozzle body 202 by a fastener in the form of a set screw 256 which extends through a radial opening 239 of the terminal housing 226 and into a complementary threaded opening 241 in the nozzle body 202 (FIG. 7).

In this embodiment, no stress relief member such as the stress relief member 112 of the first embodiment is utilized as such component is optional. It will be appreciated that a suitable structure could be utilized to keep end portions of the leads 220, 222 flush against the nozzle outer surface 204 and to provide stress relief for the terminal 224.

Figure 8:
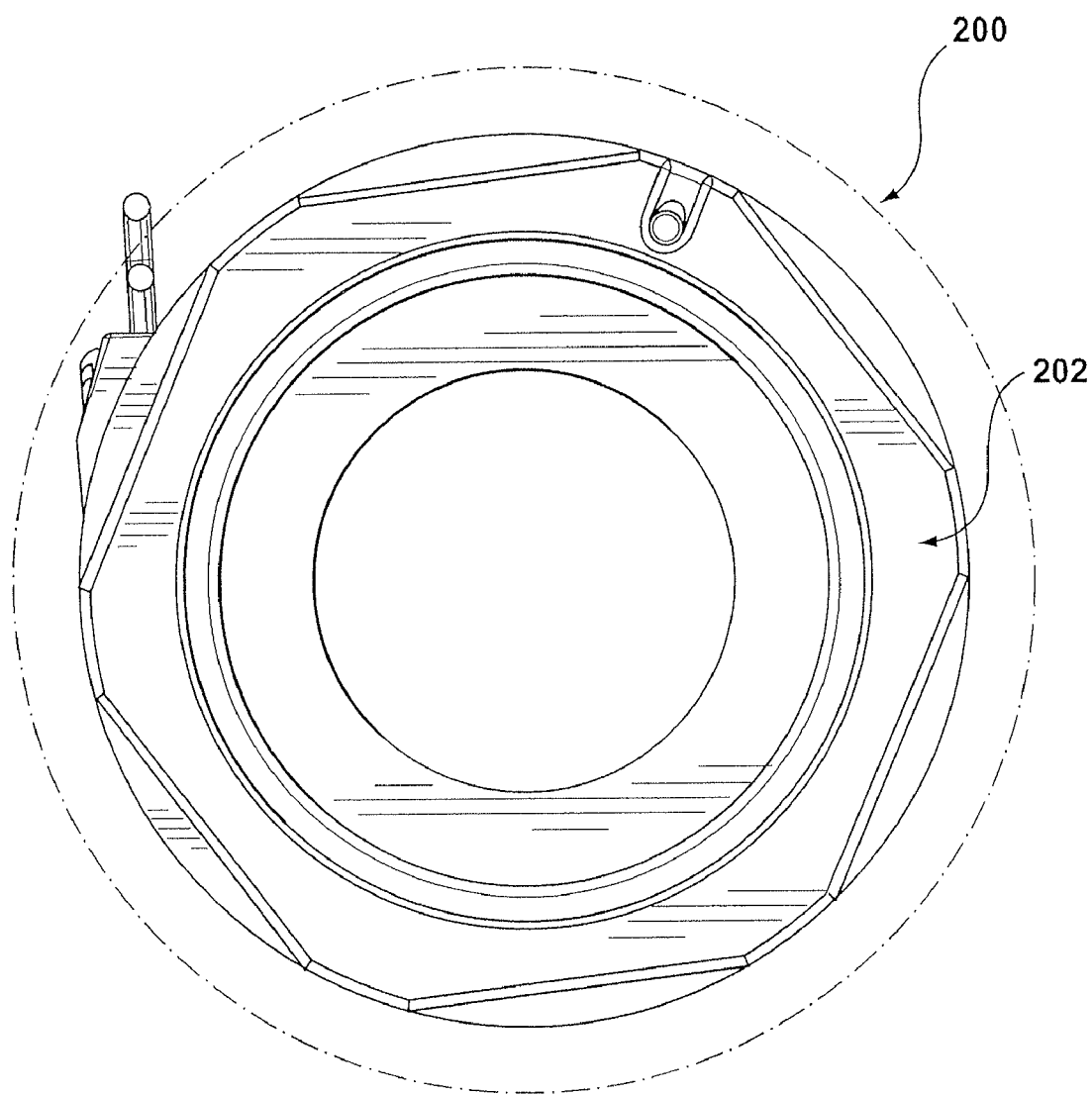
FIG. 8 is a top view of the injection molding nozzle segment of FIG. 6.

Referring to FIG. 8, which is a top view of the nozzle segment 200, it can be seen that the seat 232 is dimensioned so that at least 90% of the volume of the terminal housing 226 is contained in the seat 232 to reduce a radial size dimension of the nozzle segment 200.

The nozzle segment 200 is assembled in an injection molding apparatus in a similar fashion to the first described embodiment.

Figure 10:
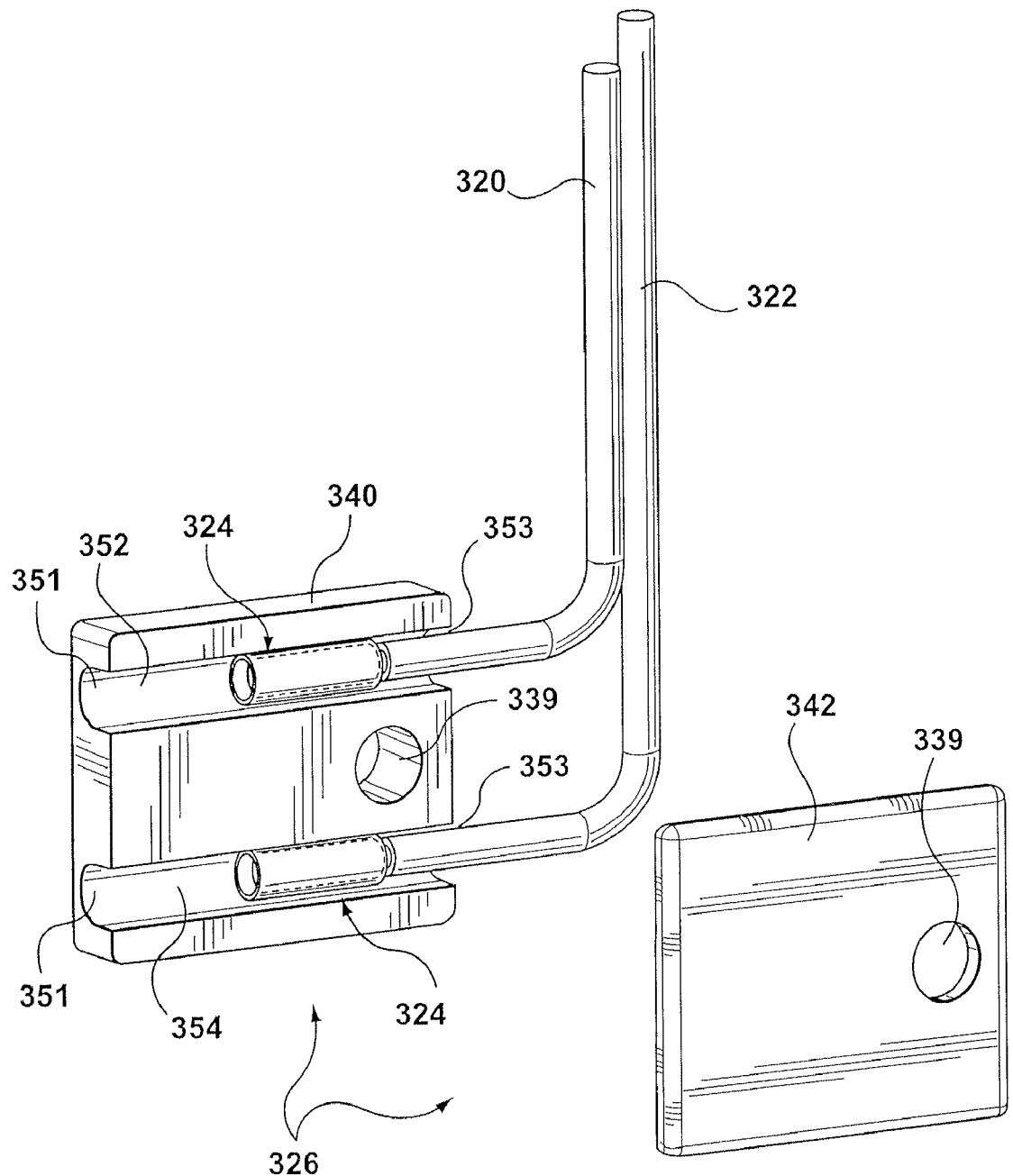
FIG. 10 is an isometric exploded view of a further embodiment of a terminal housing that can be used in the nozzles, nozzle segments and apparatus according to the present invention.
Figure 11:
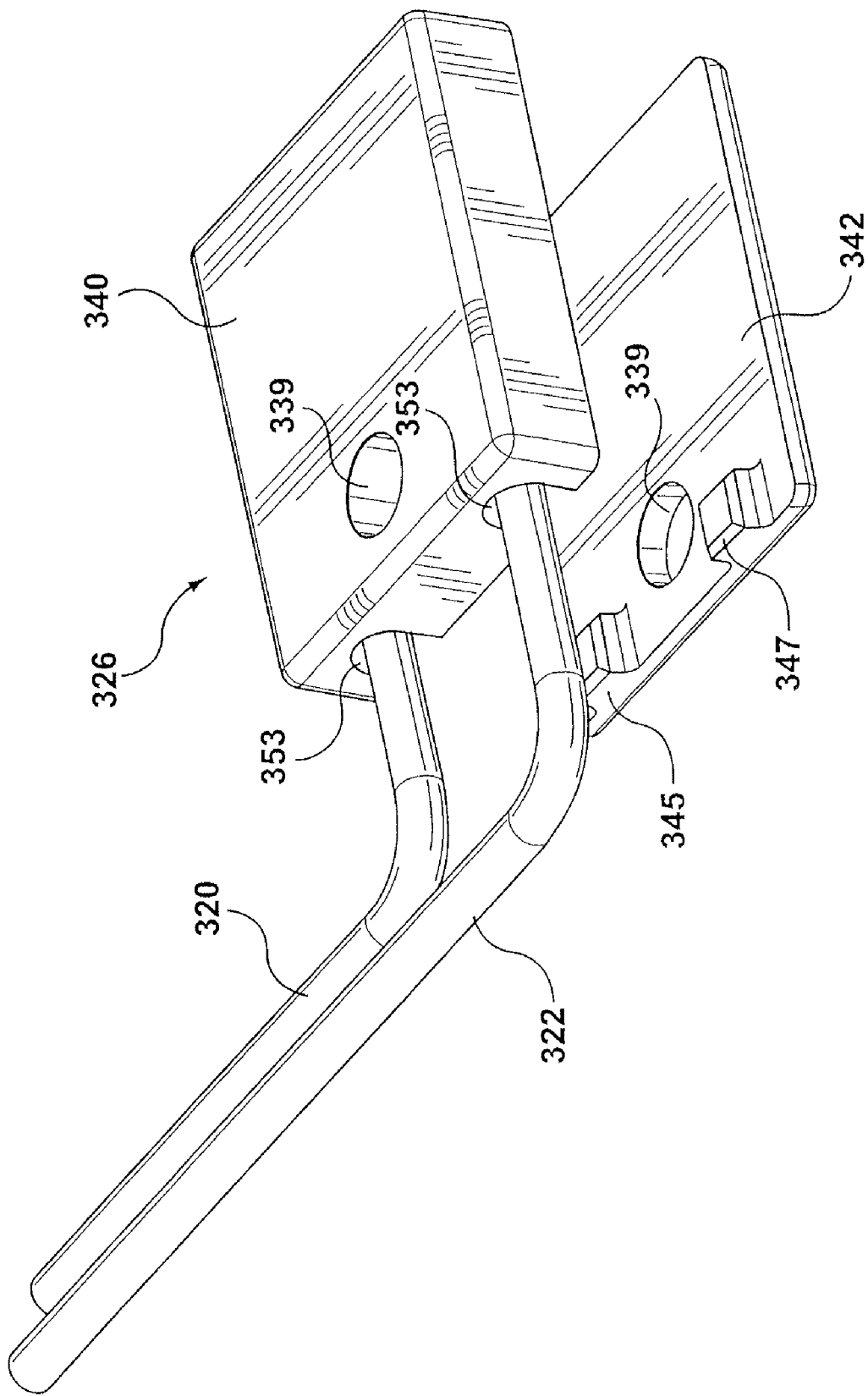
FIG. 11 is an isometric exploded view of the terminal housing of FIG. 10 shown from another angle to reveal internal structure.
Figure 12:
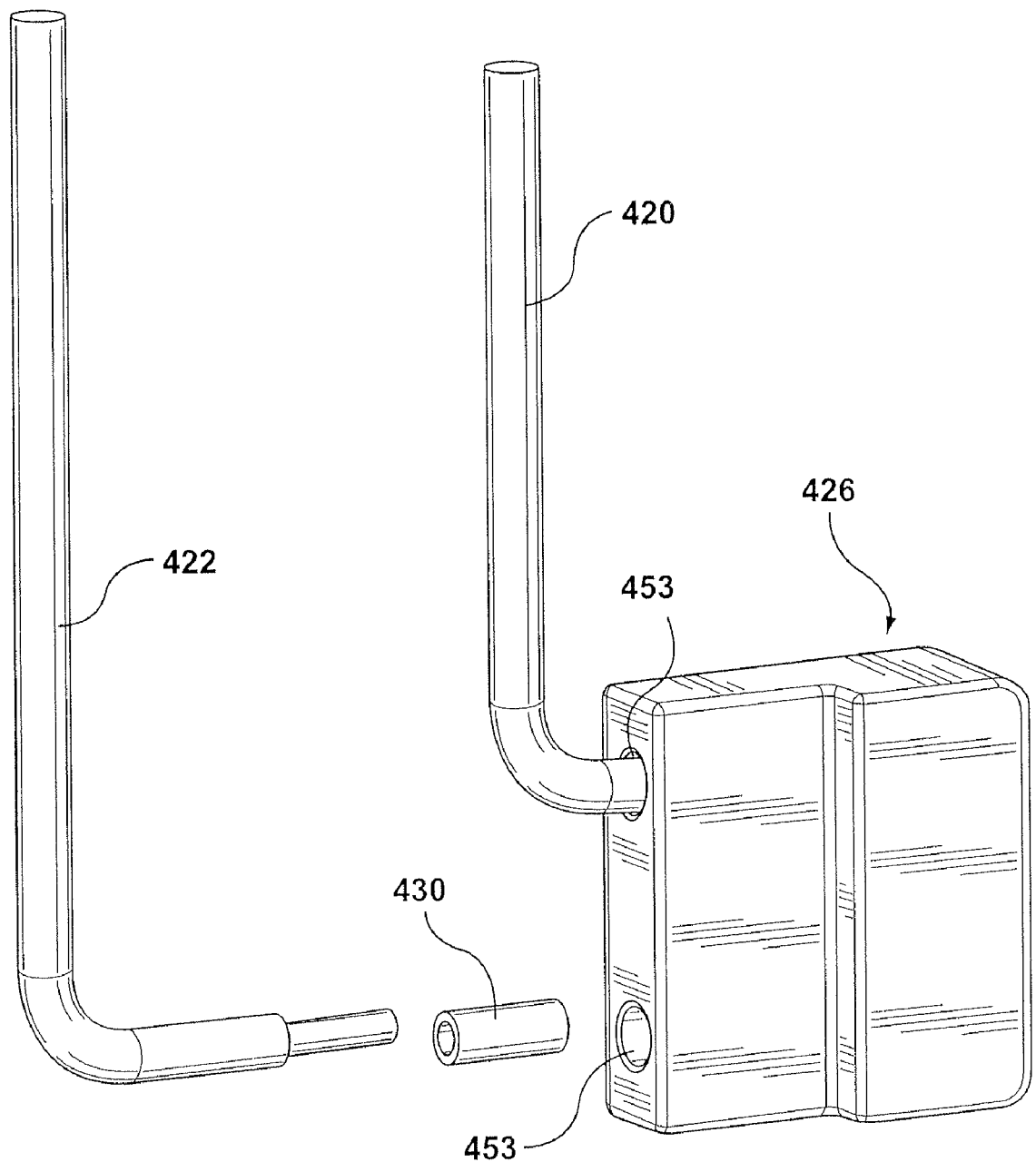
FIG. 12 is an isometric view of yet another embodiment of a terminal housing that can be used in nozzles, nozzle segments and apparatus according to the present invention.

FIGS. 10 to 12 illustrate alternative embodiments of terminal housings which may be used in the context of the present invention. These embodiments will be described using reference numerals similar to reference numerals used to describe the first embodiment except they will be in the "300" and "400" series. Only differing features and aspects of the present embodiment are described in detail. For similar parts, reference can be made to above description. The features and aspects described for previous embodiments can be used accordingly with the present embodiment.

Referring to FIGS. 9 and 10, a terminal housing 326 comprises two mutually complementary rectangular terminal housing members 340, 342 that are securable together and to a nozzle body by a fastener (not shown). The fastener may be a set screw such as the set screw 256 used in the second described embodiment. However, it can also be bolt or other suitable fastener which is capable of extending through a radial opening 339 in the terminal housing 326 and into the nozzle body (not shown).

In this embodiment, the terminal housing members 340, 342 are not identical. The radially outward terminal housing member 340 is thicker than the radially inner housing member 342 and grooved to define two channels 352, 354, extending between pairs of openings 351, 353, for receiving a terminal 324 and end portions of external leads 320, 322 and a heater (not shown). The terminal housing member 342 comprises of a relatively thin rectangular plate having on its inner surface 180 a pair of square protrusions 345, 347 which are aligned with the channels 352, 354. When the terminal housing 326 is assembled, the protrusions 345, 347 pinch the end portions of the leads 320, 322 against the radially outer housing member 340 to provide some stress relief for the terminal 324. Thus, pulling on the leads 320, 322 during assembly would be less likely to result in a loose connection at the terminal 324.

Referring now to FIG. 12, a terminal housing designated generally by reference numeral 426 according to a further embodiment is shown. The terminal housing 426 is a unitary structure having two spaced parallel channels extending between a pair of openings 453 at one end and a pair of openings (not shown) at an opposite end. To assemble a nozzle with this terminal housing, end portions of leads 420, 422 are inserted through both pairs of openings in the terminal housing 426 and crimped to end portions of a resistance heater wire of a heater (not shown) using metal crimping tubes (only crimping tube 430 being shown) to form a terminal. The terminal housing 426 is then slid over the terminal and retained within a seat formed in a nozzle body using a suitable fastener, such as the set screw and washer 156, 158 shown in FIG. 3.

Figure 13:
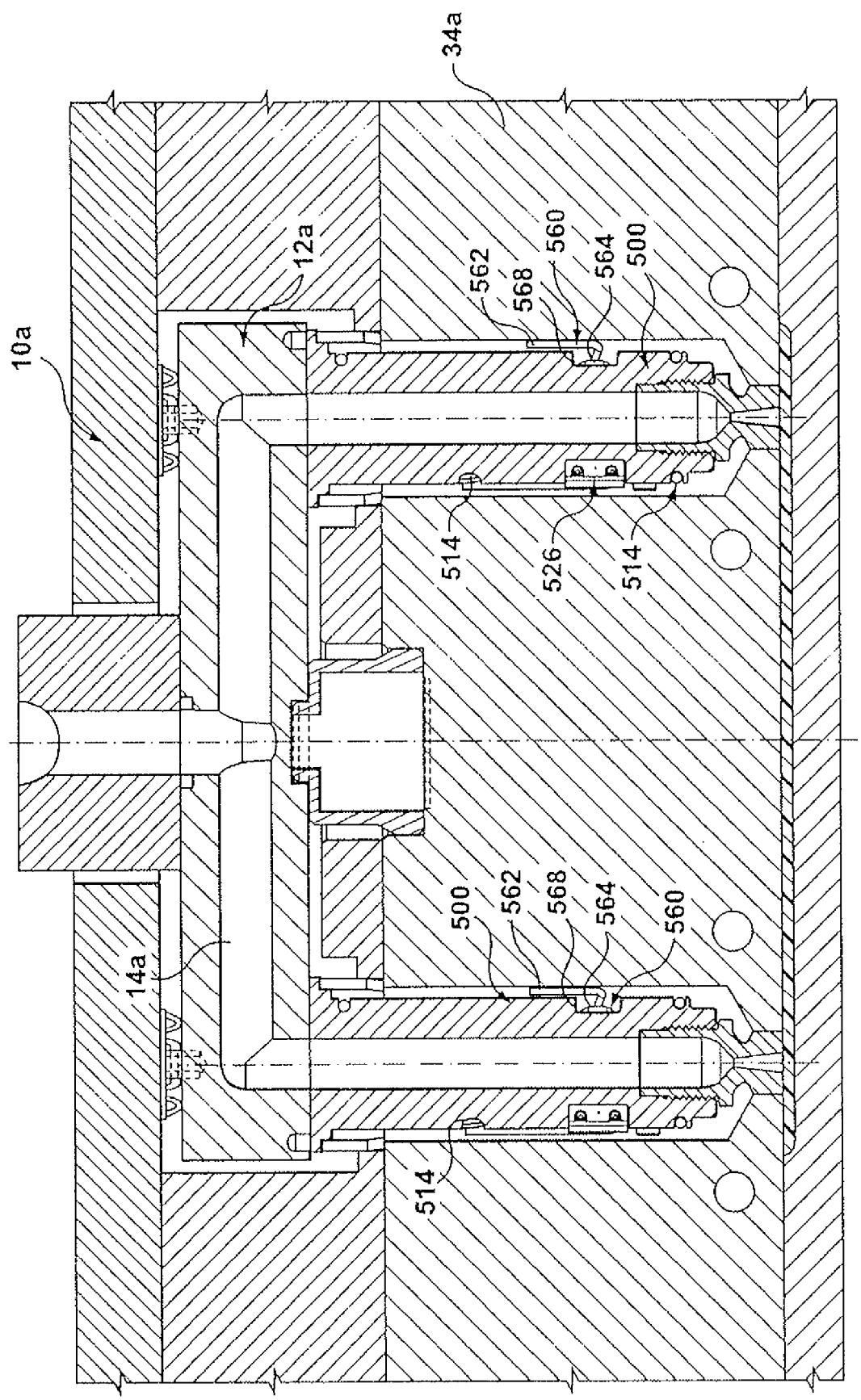
FIG. 13 is a side sectional partial view of an injection molding apparatus according to the present invention having two injection molding nozzles with recessed terminal housings.
Figure 14:
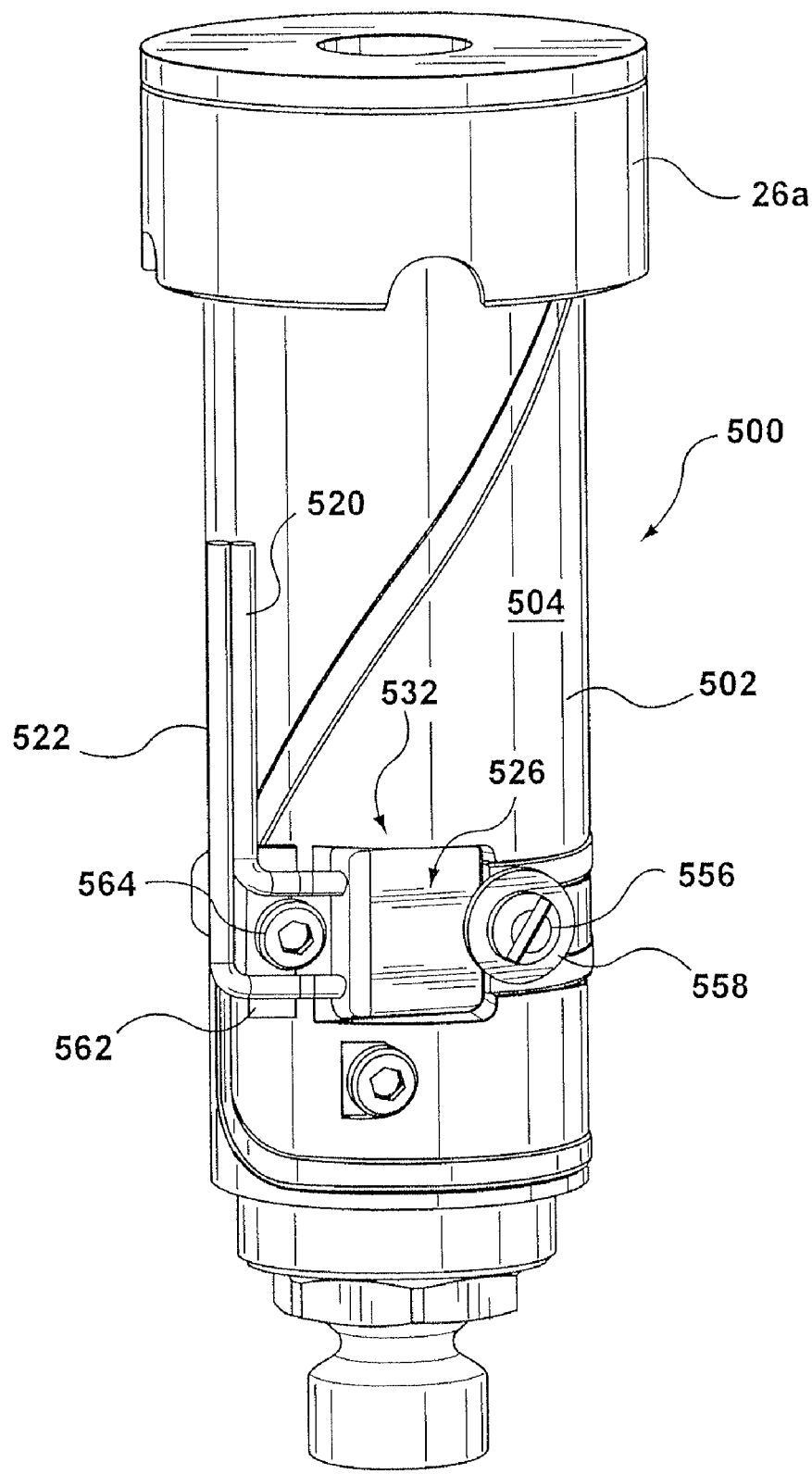
FIG. 14 is an isometric view of the injection molding nozzle, according to the present invention, used in the apparatus of FIG. 13.

Referring now to FIG. 13, an injection molding apparatus designated generally by reference numeral 10a according to a further embodiment of the invention is shown. The apparatus 10a comprises a mold manifold 12a and two injection molding nozzles designated generally by reference numeral 500 seated in the manifold 12a. FIG. 14 illustrates one of the injection molding nozzles 500. Only differing features and aspects of the present embodiment are described in detail. For similar parts, references can be made to above description. The features and aspects described for previous embodiments can be used accordingly with the present embodiment. As can be seen with reference to FIG. 14, the apparatus 10a includes, for each injection molding nozzle 500, a pair of electrically insulated leads 520, 522 having end portions extending generally tangentially to an outer surface 504 (or in a plane that is generally parallel to the tangential plane to the outer surface) of the injection molding nozzle 500. The end portions of the leads 520, 522 are electrically coupled to respective ends of a resistance heater wire of a heater 514 (shown only in FIG. 13) embedded in the outer surface 504 of the nozzle 500 in the same manner as described with reference to the first embodiment above. Thus, a terminal (not shown) is formed at the connection of the wires of the leads 520, 522 with the ends of the resistance heater wire of the heater 514. The terminal is contained in the terminal housing 526 similar to the terminal housing 126 of the first embodiment. As can be seen with reference to FIG. 13, more than 90% of the terminal housing 526 is contained within a seat 532 formed in the outer surface 504 such that a radial profile of the nozzle is reduced. The terminal housing 526 is secured to a nozzle body 502 of the nozzle 500 in the same manner as described with reference to the first embodiment. That is, a set screw 556 is screwed radially into the nozzle body 502 with a washer 558 disposed between a head of the set screw 556 and the terminal 526 to clamp the terminal housing against the nozzle body 502 within the seat 532. Similarly, a stress relief member 562 is used to relieve stress on the terminal and secured to the nozzle body 502 using a hex bolt 564.

In contrast with typical injection molding nozzles, the terminal is located downstream of a nozzle head 26a of the injection molding nozzle 500. This highlights one benefit of the present invention, namely, that the terminal and terminal housing 526 can be located anywhere along the length of the nozzle body 502 since the terminal housing 526 is able to fit within the usual space provided in mold plate 34a of the apparatus 10a for receiving the nozzles 500.

In this embodiment, the nozzles 500 further include sensors in the form of thermocouples designated generally by reference numeral 560. The thermocouple each comprise a sensor element (not shown) coupled electrically to a further external lead 562 at a terminal contained in a housing 564 that is contained in a recessed seat 568 provided in the outer surface 504. As can be seen in FIG. 13, the housing for the thermocouple terminal is contained entirely within the recessed seat 568.

Figure 15:
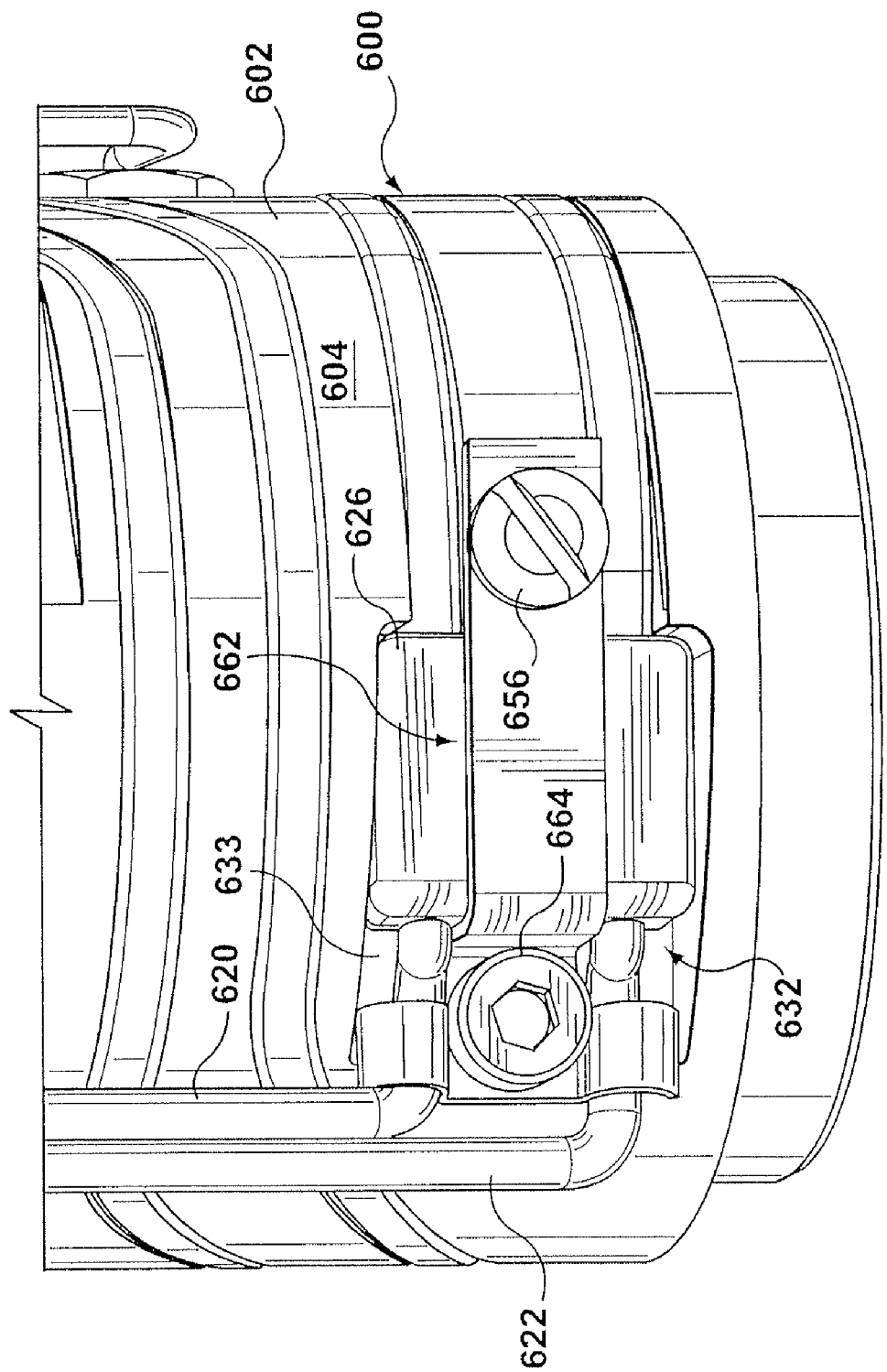
FIG. 15 is a partial isometric view of an injection molding nozzle according to the present invention having an alternative fastener for fastening the terminal housing to the nozzle body.
Figure 16:
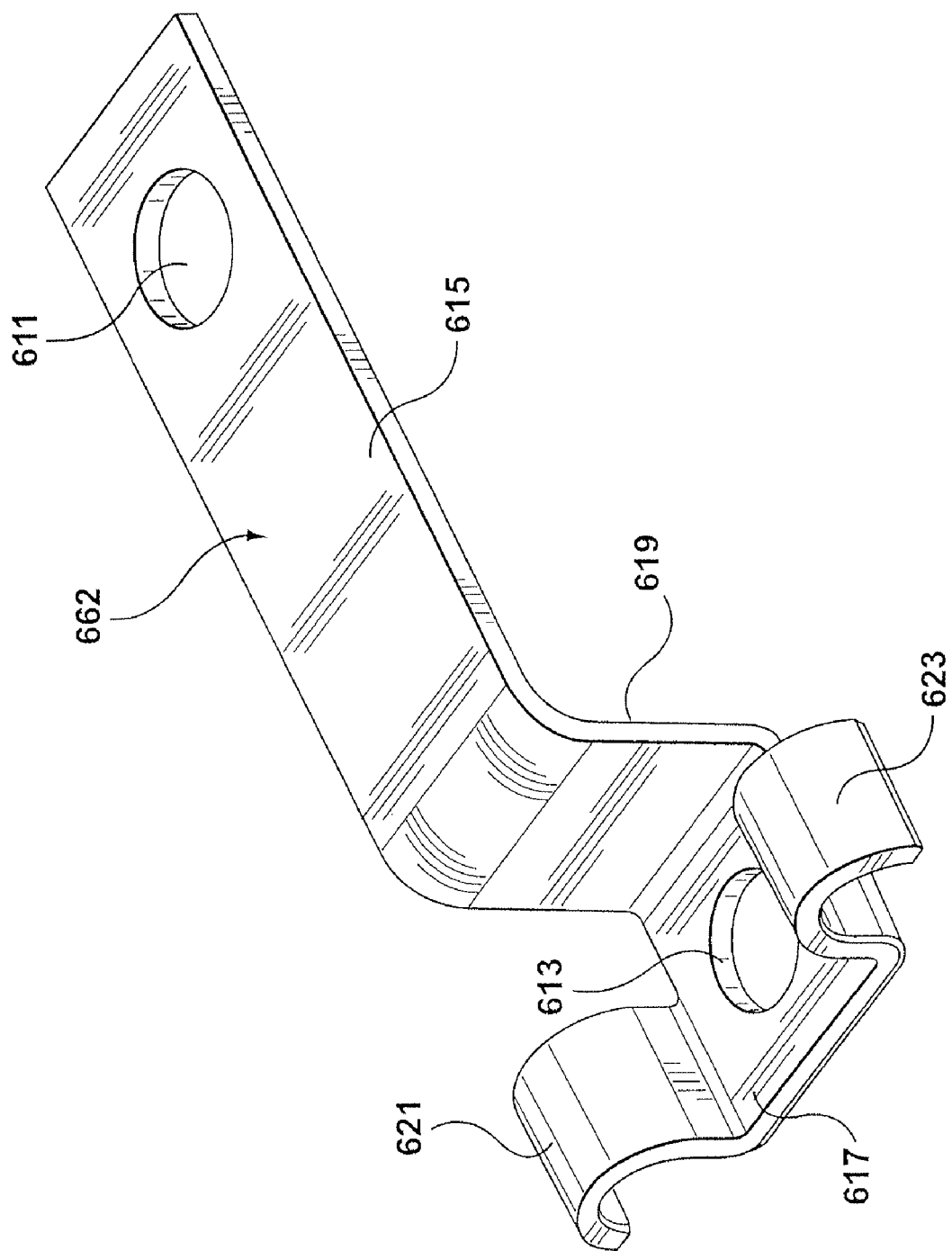
FIG. 16 is an isometric view of the fastener of FIG. 15.

Referring now to FIGS. 15 and 16, a stress relief and fastener member designated generally by reference numeral 662 which can be used in the context of the present invention as described in the embodiments above is shown. The member 662 is used to secure a terminal housing 626 to a recessed seat 632 formed in an outer surface 604 of a body 602 of a nozzle segment 600. The stress relief and fastener member 662 is secured to the nozzle body 602 using a set screw 656 and a hex bolt 664 that extend through respective openings 611, 613 into the nozzle body 602 with the terminal housing 626 sandwiched therebetween. The stress relief and fastener member 662 is a unitary piece of sheet metal stamped and bent in the shape and configuration shown. Thus, the member 662 has an elongated flat terminal housing retainer portion 615 and a curved stress relief portion 617 connected by a radially extending bridge 619 (see FIG. 16). The stress relief portion 617 includes a pair of arcuate (i.e. curved) retainers 621, 623 for retaining end portions of external insulated leads 620, 622 against a bottom wall 633 of the seat 632. This helps to provide stress relief at a terminal contained in a terminal housing 626.

It will be appreciated that numerous variations to the afore described embodiments are possible. For example, although in the embodiment described above the recessed terminal housing seat is dimensioned to accommodate at least 90% of the volume of the terminal housing, in various embodiments, the seat could be dimensioned to accommodate more or less than 90% of the terminal housing. In some embodiments, there may be no recessed seat for the terminal housing, with the terminal housing being secured to the cylindrical surface of the nozzle body.

Figure 17:
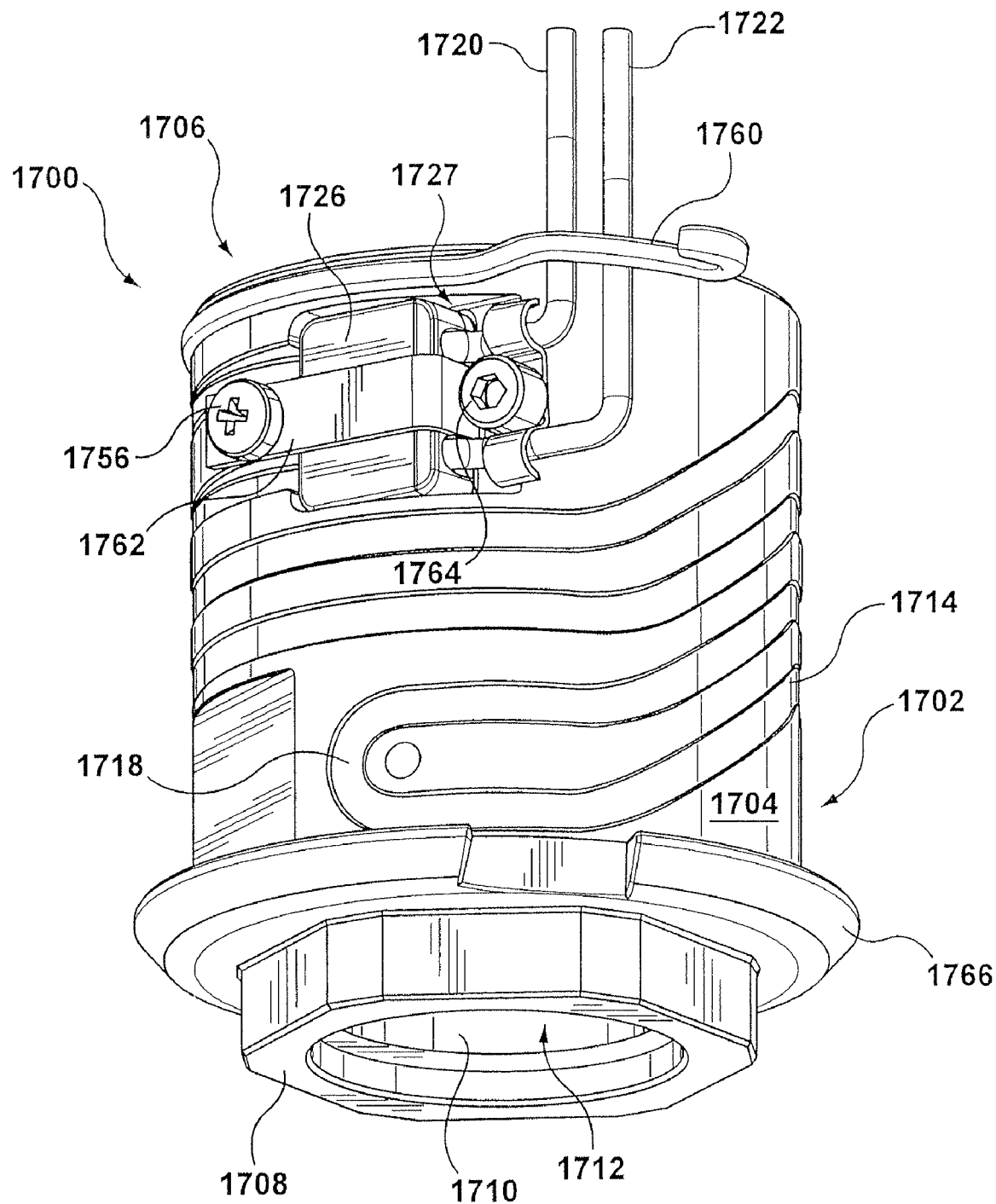
FIG. 17 is a perspective view of an injection molding nozzle segment having a recessed terminal housing according to an embodiment of the invention.

Referring to FIG. 17, an injection molding nozzle segment according to another embodiment of the invention is shown and designated generally by reference numeral 1700. Nozzle segment 1700 is similar to the nozzle segments described above, with differences that will be apparent from the Figures and the following description. In the description of this embodiment, like reference numerals in the 1700 series are used to describe like parts for ease of understanding. Only differing features and aspects of the present embodiment are described in detail. For similar parts reference can be made to the above description. The features and aspects described for previous embodiments can be used accordingly with the present embodiment. The nozzle segment 1700 is a modular component of an injection molding nozzle to be formed therewith, and has a cylindrical nozzle body designated generally by reference numeral 1702 having an outer surface 1704, first and second opposed ends 1706, 1708 and an inner surface 1710 defining a central melt channel 1712 extending between the ends 1706, 1708. As can be seen in FIG. 17, the nozzle body 1702 is shaped to facilitate connection to other nozzle body segments and/or other parts of an injection molding nozzle.

The injection molding nozzle segment 1700 further includes an electrically conductive element in the form of a heater 1714 coupled to, e.g., embedded in, the outer surface 1704 and extending in a spiral configuration. The heater 1714 comprises a conductive electrical wire, e.g., a resistance heater wire, surrounded by electrical insulation that is covered by a sheath (e.g., a metal sheath). The heater 1714 has a portion 1718 formed into a U-shaped bend and two opposite ends which are electrically coupled to ends of electrical wires of two respective external leads 1720, 1722 within a terminal housing 1726. The terminal housing 1726 is generally tangential to the outer surface of the nozzle body 1702 (or in a plane that is generally parallel to the tangential plane to the outer surface) and sits in a recess 1727 in the nozzle body 1702. Within the terminal housing 1726, the ends of the resistance heater wire are crimped to the ends of the wires of the leads 1720, 1722 with metal crimping tubes (e.g., tubes 128, 130 of FIG. 2) to form connections. To secure the terminal housing 1726 and the adjacent ends of the external leads 1720, 1722 is a fastener 1762, such as bracket 662 shown in FIG. 16. Screws or bolts 1756, 1764 hold the fastener 1762 to the nozzle body 1702, and these may have washers as well. The fastener 1762 may be omitted, and an adhesive may be used instead. Another option is to have the terminal housing 1726 held to the nozzle body 1702 by simply the rigidity of the heater 1714 and/or the leads 1720, 1722. A retaining clip 1760 is provided to hold the external leads 1720, 1722 and keep them from becoming tangled or going out of position. The retaining clip 1760 may be designed to keep the external leads 1720, 1722 only loosely against the nozzle body 1702, so as to keep heat emitting from the nozzle body 1702 from damaging the external leads 1720, 1722.

The injection molding nozzle segment 1700 further includes a projecting rim 1766, which can be circumferentially continuous or discontinuous (i.e., having a break, as shown), and which may serve to align the nozzle segment 1700 within a nozzle well and/or protect the components of the nozzle segment 1700, particularly the terminal housing 1726, from damage during installation or operation. The rim 1766 may also serve to similarly protect the external leads 1720, 1722 and the retaining clip 1760.

Figure 18:
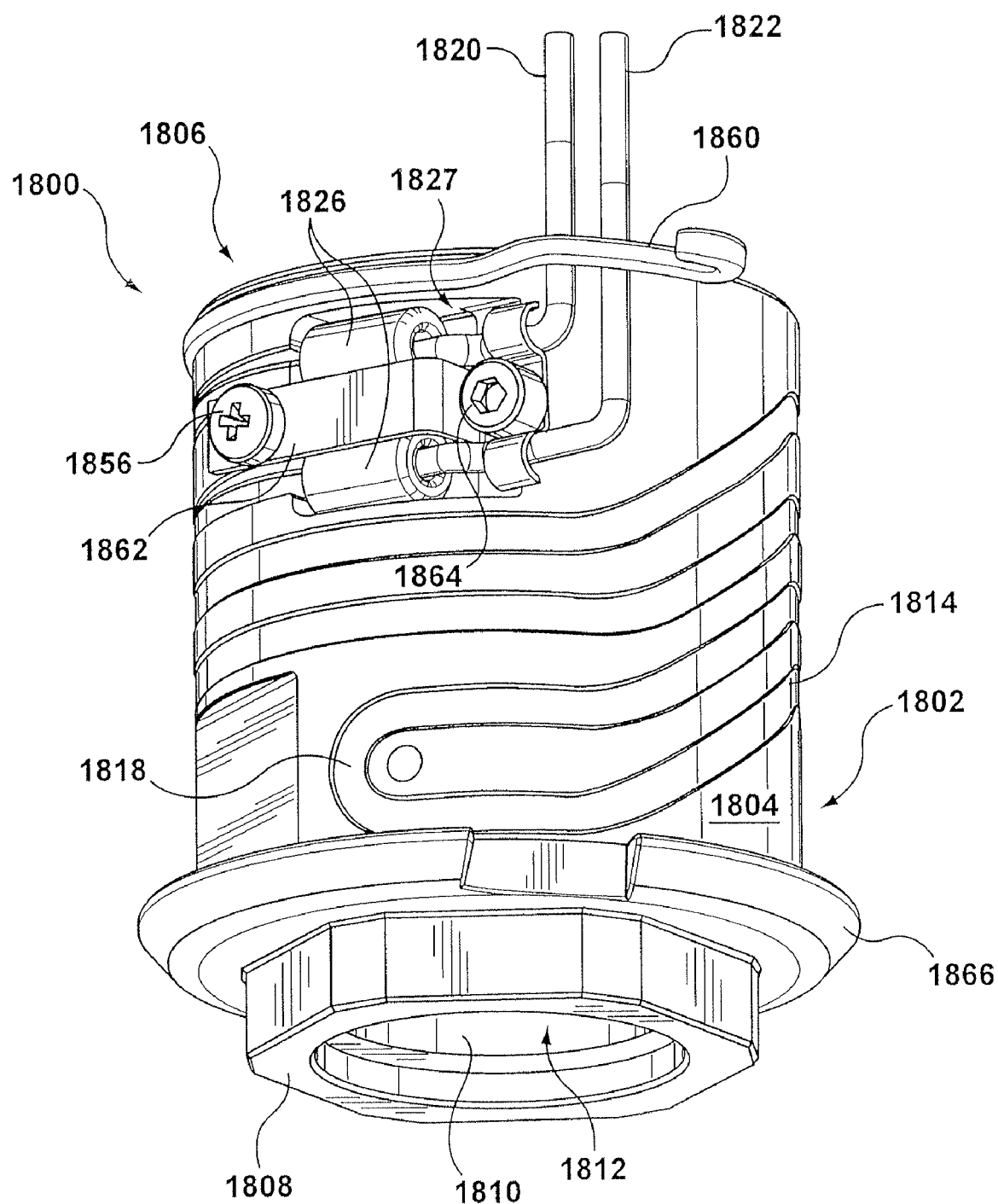
FIG. 18 is a perspective view of an injection molding nozzle segment having recessed terminal housings according to an embodiment of the invention.

Referring to FIG. 18, an injection molding nozzle segment according to one embodiment of the invention is shown and designated generally by reference numeral 1800. Nozzle segment 1800 is similar to the nozzle segments described above, with differences that will be apparent from the Figures and the following description. In the description of this embodiment, like reference numerals in the 1800 series are used to describe like parts for ease of understanding. Only differing features and aspects of the present embodiment are described in detail. For similar parts reference can be made to the above description. The features and aspects described for previous embodiments can be used accordingly with the present embodiment. The nozzle segment 1800 is a modular component of an injection molding nozzle to be formed therewith, and has a cylindrical nozzle body designated generally by reference numeral 1802 having an outer surface 1804, first and second opposed ends 1806, 1808 and an inner surface 1810 defining a central melt channel 1812 extending between the ends 1806, 1808. As can be seen in FIG. 18, the nozzle body 1802 is shaped to facilitate connection to other nozzle body segments and/or other parts of an injection molding nozzle. The injection molding nozzle segment 1800 further includes an electrically conductive element in the form of a heater 1814 coupled to, e.g., embedded in, the outer surface 1804 and extending in a spiral configuration. The heater 1814 has a portion 1818 formed into a U-shaped bend and two opposite ends which are electrically coupled to ends of electrical wires of two respective external leads 1820, 1822 within a pair of respective cylindrical terminal housings 1826. Each terminal housing 1826 is generally tangential to the outer surface of the nozzle body 1802 (or in a plane that is generally parallel to the tangential plane to the outer surface) and sits in a recess 1827 in the nozzle body 1802. Within each terminal housing 1826, the respective end of the resistance heater wire is crimped to the end of the respective wire of the leads 1820, 1822 with a metal crimping tube (e.g., tubes 1828, 1830 of FIG. 20) to form connections. To secure the terminal housings 1826 and the adjacent ends of the external leads 1820, 1822 is a fastener 1862, similar to bracket 662 shown in FIG. 16. Screws or bolts 1856, 1864 hold the fastener 1862 to the nozzle body 1802, and these may have washers as well. The fastener 1862 may be omitted, and an adhesive may be used instead. Another option is to have the terminal housings 1826 held to the nozzle body 1802 by simply the rigidity of the heater 1814 and/or the leads 1820, 1822. A retaining clip 1860 is provided to hold the external leads 1820, 1822 and keep them from becoming tangled or going out of position. The retaining clip 1860 may be designed to keep the external leads 1820, 1822 only loosely against the nozzle body 1802, so as to keep heat emitting from the nozzle body 1802 from damaging the external leads 1820, 1822.

The injection molding nozzle segment 1800 further includes a projecting rim 1866, which can be circumferentially continuous or discontinuous (i.e., having a break, as shown), and which may serve to align the nozzle segment 1800 within a nozzle well and/or protect the components of the nozzle segment 1800, particularly the terminal housings 1826, from damage during installation or operation. The rim 1866 may also serve to similarly protect the external leads 1820, 1822 and the retaining clip 1860.

Figure 19:
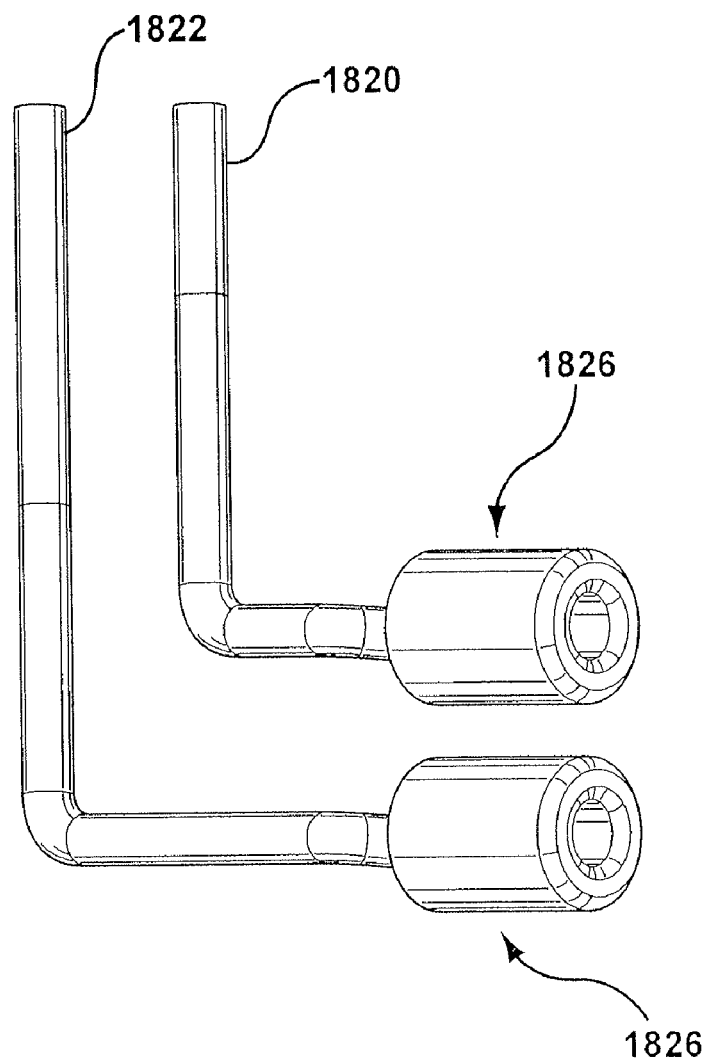
FIG. 19 is a perspective view of the terminal housings removed from the nozzle segment of FIG. 18.

FIG. 19 illustrates the terminal housings 1826 removed from the nozzle segment 1800, as well as the connected external leads 1820, 1822.

Figure 20:
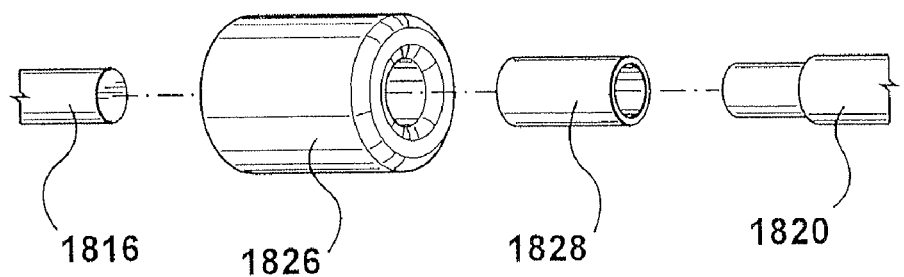
FIG. 20 is an exploded view of a connection at a terminal housing of FIG. 18.

FIG. 20 shows one terminal housing 1826 along with a metal crimping tube 1828. A resistance heater wire 1816 from inside the heater 1814 and a stripped portion of the external lead 1820 (1822) are inserted into the metal crimping tube 1828. The metal crimping tube 1828 is then crimped to electrically and mechanically secure the resistance heater wire 1816 and the external lead 1820 (1822) together. The crimped connection is then positioned inside the terminal housing 1826 so that the terminal housing 1826 mechanically protects and/or electrically insulates any exposed metal of the connection.

Figure 21:
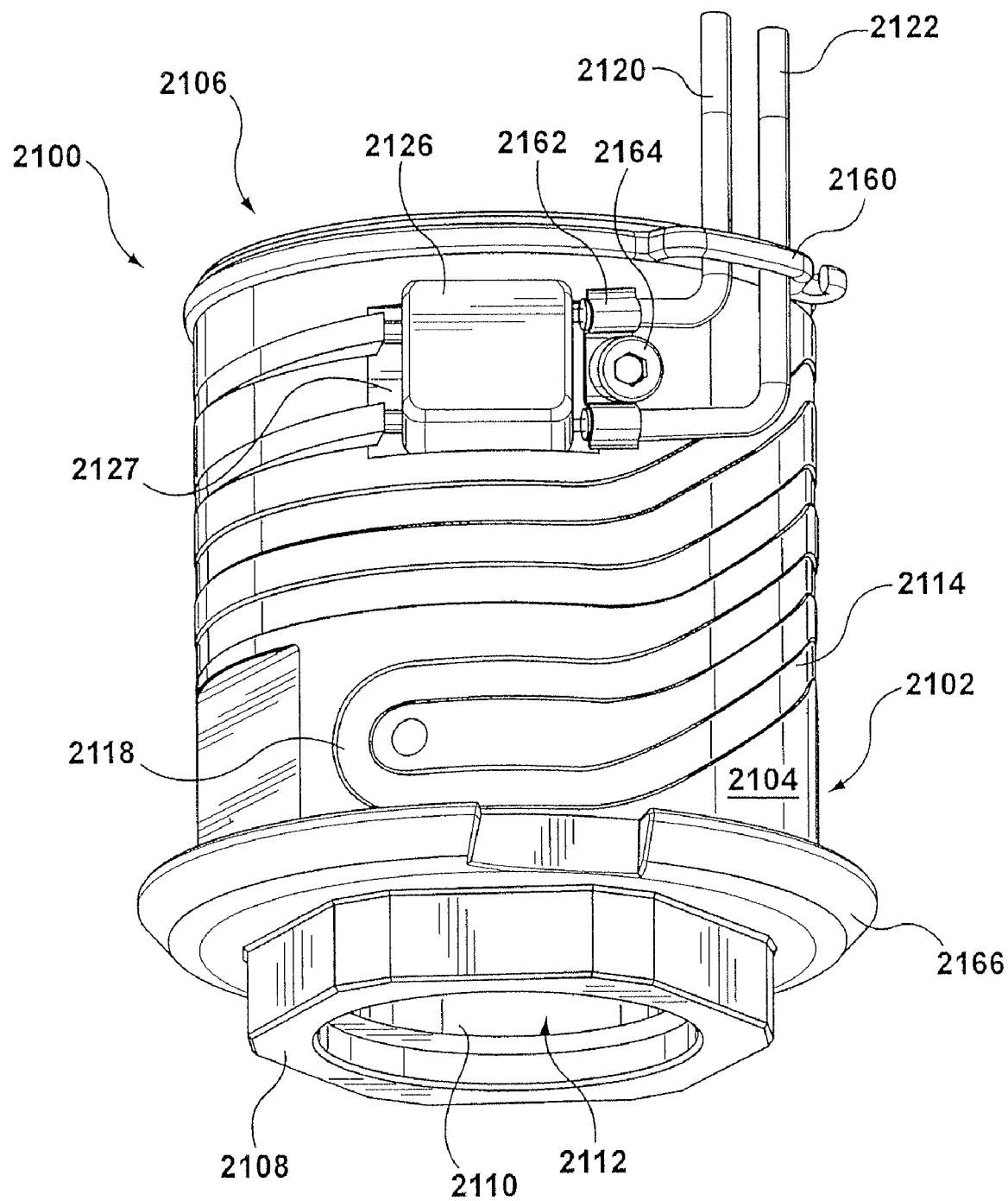
FIG. 21 is a perspective view of an injection molding nozzle segment having a raised terminal housing according to an embodiment of the invention.

Referring to FIG. 21, an injection molding nozzle segment according to one embodiment of the invention is shown and designated generally by reference numeral 2100. Nozzle segment 2100 is similar to the nozzle segments described above, with differences that will be apparent from the Figures and the following description. In the description of this embodiment, like reference numerals in the 2100 series are used to describe like parts for ease of understanding. Only differing features and aspects of the present embodiment are described in detail. For similar parts reference can be made to the above description. The features and aspects described for previous embodiments can be used accordingly with the present embodiment. The nozzle segment 2100 is a modular component of an injection molding nozzle to be formed therewith, and has a cylindrical nozzle body designated generally by reference numeral 2102 having an outer surface 2104, first and second opposed ends 2106, 2108 and an inner surface 2110 defining a central melt channel 2112 extending between the ends 2106, 2108. As can be seen in FIG. 21, the nozzle body 2102 is shaped to facilitate connection to other nozzle body segments and/or other parts of an injection molding nozzle.

The injection molding nozzle segment 2100 further includes an electrically conductive element in the form of a heater 2114 coupled to, e.g., embedded in, the outer surface 2104 and extending in a spiral configuration. The heater 2114 comprises a conductive electrical wire, e.g., a resistance heater wire, surrounded by electrical insulation that is covered by a sheath (e.g., a metal sheath). The heater 2114 has a portion 2118 formed into a U-shaped bend and two opposite ends which are electrically coupled to ends of electrical wires of two respective external leads 2120, 2122 within a terminal housing 2126. The terminal housing 2126 is generally tangential to the outer surface of the nozzle body 2102 (or in a plane that is generally parallel to the tangential plane to the outer surface) and sits on an optional flat surface 2127 of the nozzle body 2102. Within the terminal housing 2126, the ends of the resistance heater wire are crimped to the ends of the wires of the leads 2120, 2122 with metal crimping tubes (e.g., tubes 128, 130 of FIG. 2) to form connections. The terminal housing 2164 can be held to the nozzle body 2102 by an adhesive or by simply the rigidity of the heater 2114 and/or the leads 2120, 2122. To secure the external leads 2120, 2122 to the nozzle body 2102 is a fastener 2162, such as bracket or strip made of metal or similar rigid material. A screw or bolt 2164 holds the fastener 2162 to the nozzle body 2102, and this may have a washer as well. The fastener 2162 may be omitted, and an adhesive may be used instead if desired. A retaining clip 2160 is provided to hold the external leads 2120, 2122 and keep them from becoming tangled or going out of position. The retaining clip 2160 may be designed to keep the external leads 2120, 2122 only loosely against the nozzle body 2102, so as to keep heat emitting from the nozzle body 2102 from damaging the external leads 2120, 2122.

As can be seen in FIG. 21, the terminal housing 2126 is raised with respect to the outer surface 2104 of the nozzle body 2102. As such, the heater 2114 can be made to emerge from its groove as it approaches the terminal housing 2126. The groove itself may be made shallower to accommodate this. This is less of a concern if the heater 2114 is not in a groove or only partially embedded in a groove.

The injection molding nozzle segment 2100 further includes a projecting rim 2166, which can be circumferentially continuous or discontinuous (i.e., having a break, as shown), and which may serve to align the nozzle segment 2100 within a nozzle well and/or protect the components of the nozzle segment 2100, particularly the raised terminal housing 2126, from damage during installation or operation. To protect the raised terminal housing 2126, the rim 2166 can project from the outer surface 2104 more than the terminal housing 2126 does. The rim 2166 may also serve to similarly protect the external leads 2120, 2122 and the retaining clip 2160.

Figure 22:
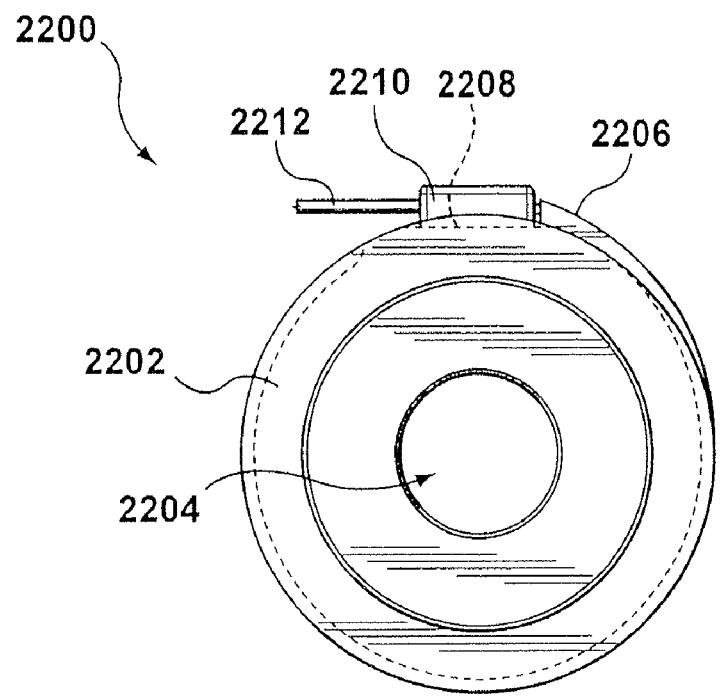
FIG. 22 is a simplified end view of an injection molding nozzle or nozzle segment having a raised terminal housing.

FIG. 22 shows a simplified end view of an injection molding nozzle or a nozzle segment 2200, which could for example be similar to any of the nozzle or nozzle segments in the embodiments previously described. The nozzle (or nozzle segment) 2200 includes a nozzle body 2202 having a melt channel 2204 therein. A heater 2206, such as the heaters previously described, is wrapped around the nozzle body 2202 in a spiral fashion. The heater 2206 may be embedded in a groove (as shown), partially embedded in a groove, or simply wrapped the outside of the nozzle body 2202 (i.e., non-embedded). When the heater 2206 is embedded or partially embedded in a groove, the heater 2206 can be made to emerge from the groove as it approaches a terminal housing 2210. The terminal housing 2210 is generally tangential to the outer surface of the nozzle body 2202 (or in a plane that is generally parallel to the tangential plane to the outer surface), and has an outer portion that is raised or extends radially outward from the cylindrical outer surface of the nozzle body. The resistance wire of the heater 2206 is connected to one or more external leads 2212 in the terminal housing 2210, as has been discussed. A portion 2208 of the nozzle body 2202 is machined flat to accommodate a corresponding flat surface of the terminal housing 2210. The flat surface 2208 requires little additional machining, but provides a good seat for the terminal housing 2210.

Figure 23:
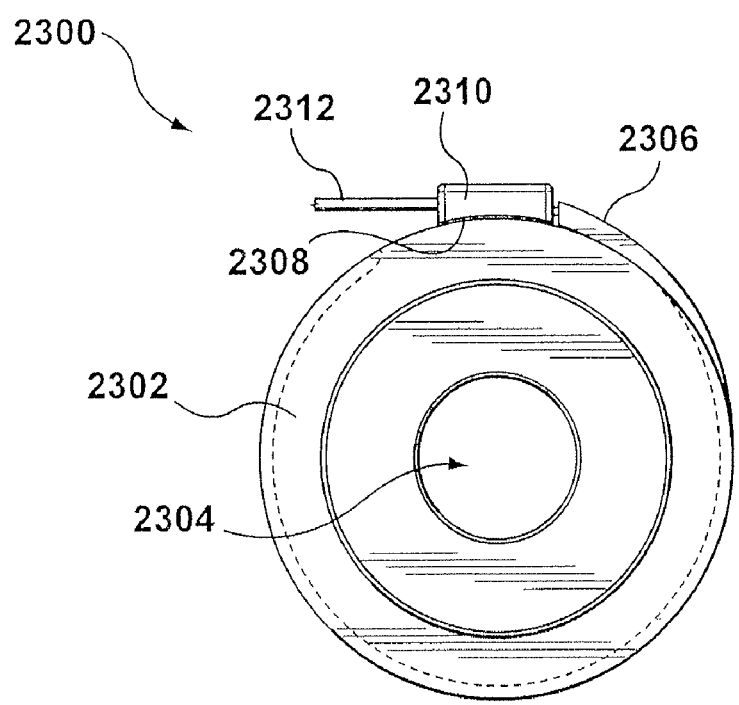
FIG. 23 is a simplified end view of an injection molding nozzle or nozzle segment having a raised terminal housing.

FIG. 23 shows a simplified end view of an injection molding nozzle or a nozzle segment, which could for example be similar to any of the nozzle or nozzle segments previously described. A nozzle (or nozzle segment) 2300 includes a nozzle body 2302 having a melt channel 2304 therein. A heater 2306, such as the heaters previously described, is wrapped around the nozzle body 2302 in a spiral fashion. The heater 2306 may be embedded in a groove (as shown), partially embedded in a groove, or simply wrapped around the outside of the nozzle body 2302 (i.e., non-embedded). When the heater 2306 is embedded or partially embedded in a groove, the heater 2306 can be made to emerge from the groove as it approaches a terminal housing 2310. The terminal housing 2310 is generally tangential to the outer surface of nozzle body 2302 (or in a plane that is generally parallel to the tangential plane to the outer surface), and has a portion that is raised relative to the nozzle body. The resistance wire of the heater 2306 is connected to one or more external leads 2312 in the terminal housing 2310, as has been discussed. A bottom surface 2308 of the terminal housing 2310 is rounded so as to fit the outside surface of the nozzle body 2302. The nozzle body 2302 therefore requires little if any additional machining to provide a good seat for the terminal housing 2310.

Figure 24:
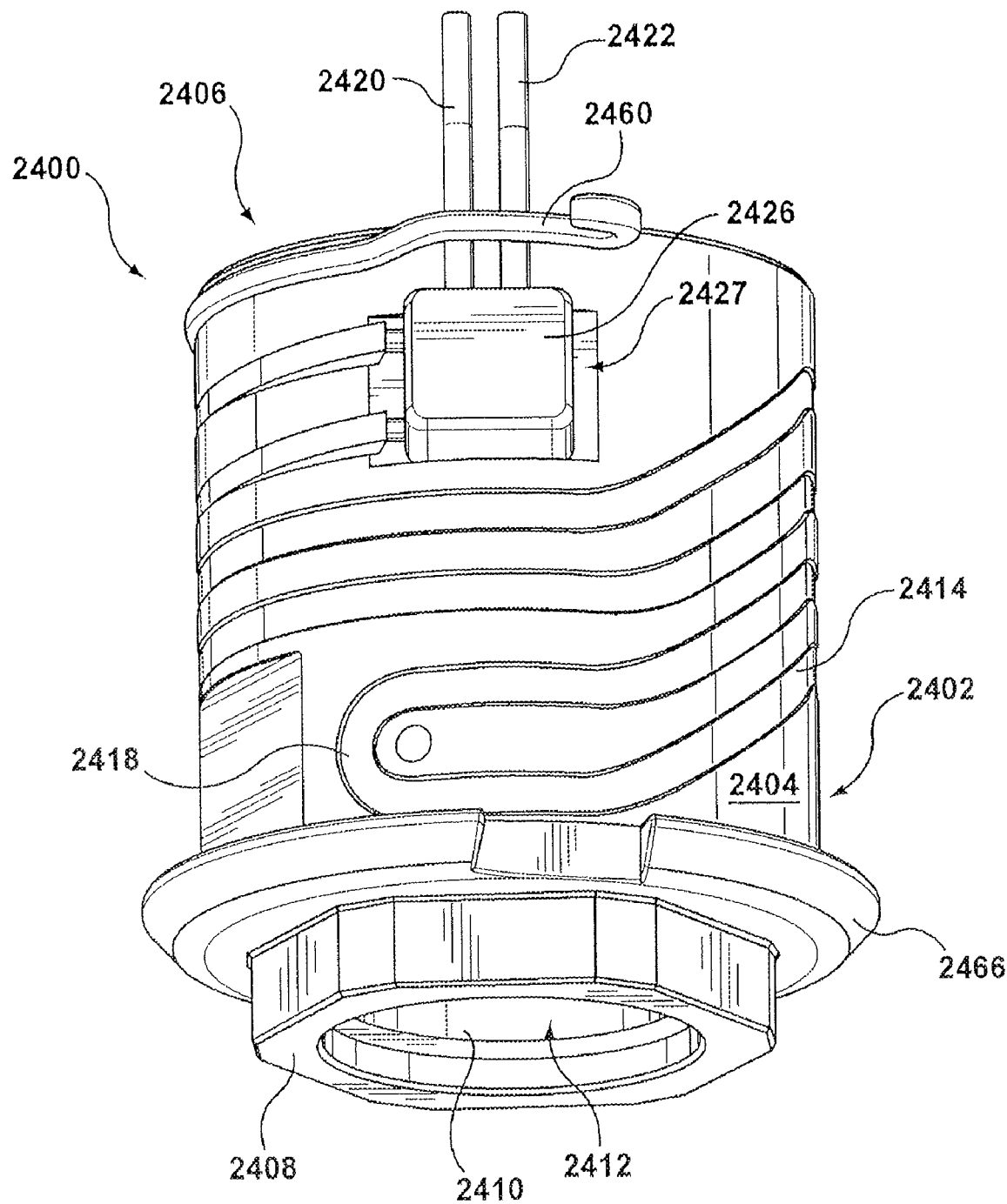
FIG. 24 is a perspective view of an injection molding nozzle segment having a raised terminal housing according to an embodiment of the invention.

Referring to FIG. 24, an injection molding nozzle segment according to one embodiment of the invention is shown and designated generally by reference numeral 2400. Nozzle segment 2400 is similar to the nozzle segments described above, with differences that will be apparent from the Figures and the following description. The nozzle segment 2400 is a modular component of an injection molding nozzle to be formed therewith, and has a cylindrical nozzle body designated generally by reference numeral 2402 having an outer surface 2404, first and second opposed ends 2406, 2408 and an inner surface 2410 defining a central melt channel 2412 extending between the ends 2406, 2408. As can be seen in FIG. 24, the nozzle body 2402 is shaped to facilitate connection to other nozzle body segments and/or other parts of an injection molding nozzle. The injection molding nozzle segment 2400 further includes an electrically conductive element in the form of a heater 2414 coupled to, e.g., embedded in, the outer surface 2404 and extending in a spiral configuration. The heater 2414 comprises a conductive electrical wire, e.g., a resistance heater wire, surrounded by electrical insulation that is covered by a sheath (e.g., a metal sheath). The heater 2414 has a portion 2418 formed into a U-shaped bend and two opposite ends which are electrically coupled to ends of electrical wires of two respective external leads 2420, 2422 within a terminal housing 2426. The terminal housing 2426 is generally tangential to the outer surface of the nozzle body 2402 (or in a plane that is generally parallel to the tangential plane to the outer surface) and sits on an optional flat surface 2427 of the nozzle body 2402. Within the terminal housing 2426, the ends of the resistance heater wire are crimped to the ends of the wires of the leads 2420, 2422 with metal crimping tubes (e.g., tubes 128, 130 of FIG. 2) to form connections. In this embodiment, the two external leads 2420, 2422 emerge from the terminal housing 2426 at approximate right angles with respect to the heater 2414 in the vicinity of the terminal housing 2426. The terminal housing 2464 can be held to the nozzle body 2402 by an adhesive or by simply the rigidity of the heater 2414 and/or the leads 2420, 2422. A fastener (e.g., bracket 662 of FIG. 16), such as bracket or strip made of metal or similar rigid material, can also be used. A retaining clip 2460 is provided to hold the external leads 2420, 2422 and keep them from becoming tangled or going out of position. The retaining clip 2460 may be designed to keep the external leads 2420, 2422 only loosely against the nozzle body 2402, so as to keep heat emitting from the nozzle body 2402 from damaging the external leads 2420, 2422.

As can be seen in FIG. 24, the terminal housing 2426 has an outer portion that is raised or extends radially outward from the cylindrical outer surface 2404 of the nozzle body 2402. As such, the heater 2414 can be made to emerge from its groove as it approaches the terminal housing 2426. The groove itself may be made shallower to accommodate this. If the heater 2414 is not in a groove or only partially embedded in a groove, then the extent that it has to emerge from the body is lessened.

The injection molding nozzle segment 2400 further includes a projecting rim 2466, which can be circumferentially continuous or discontinuous (i.e., having a break, as shown), and which may serve to align the nozzle segment 2400 within a nozzle well and/or protect the components of the nozzle segment 2400, particularly the raised terminal housing 2426, from damage during installation or operation. To protect the raised terminal housing 2426, the rim 2466 can project from the outer surface 2404 more than the terminal housing 2426 does. The rim 2466 may also serve to similarly protect the external leads 2420, 2422 and the retaining clip 2460.

Figure 25:
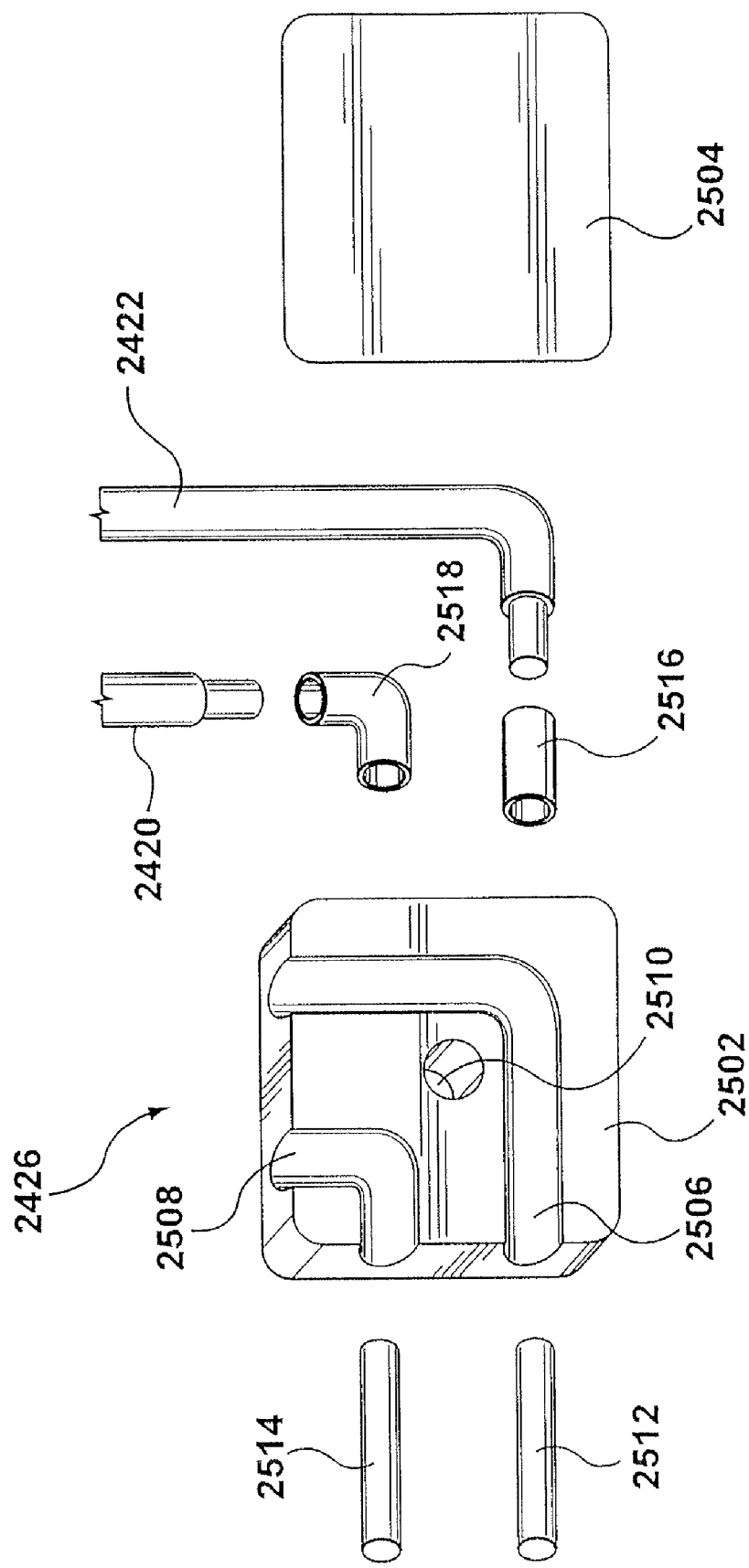
FIG. 25 is an exploded view of the terminal housing and related wires of FIG. 24.

FIG. 25 illustrates an embodiment of the terminal housing 2426 shown in FIG. 24. The terminal housing 2426 comprises a base piece 2502 and a cover piece 2504. The base piece 2502 has L-shaped channels 2506, 2508 and a female receiver (e.g., recess) 2510. The cover piece 2504 has a male protrusion (hidden from view, but similar to protrusion 148 in FIG. 5, for example) that can mate with the female receiver 2510 to join the base piece 2502 and the cover piece 2504. The base piece 2502 and the cover piece 2504 can be loosely joined and held together by an external fastener or can be fixed together by an adhesive or by a snap fit between the male protrusion and the female receiver 2510. The external leads 2420, 2422 have ends that are stripped of insulation and joined to ends 2512, 2514 of the heater 2414 by way of metal crimping tubes 2516, 2518. The crimping tube 2518 is L-shaped and the crimping tube 2516 is straight, although any combination of tubes of these shapes can be used. Thus, the terminal housing 2426 achieves a 90 degree arrangement between the ends 2512, 2514 of the heater 2414 and the ends of the external leads 2420, 2422.

Figure 26:
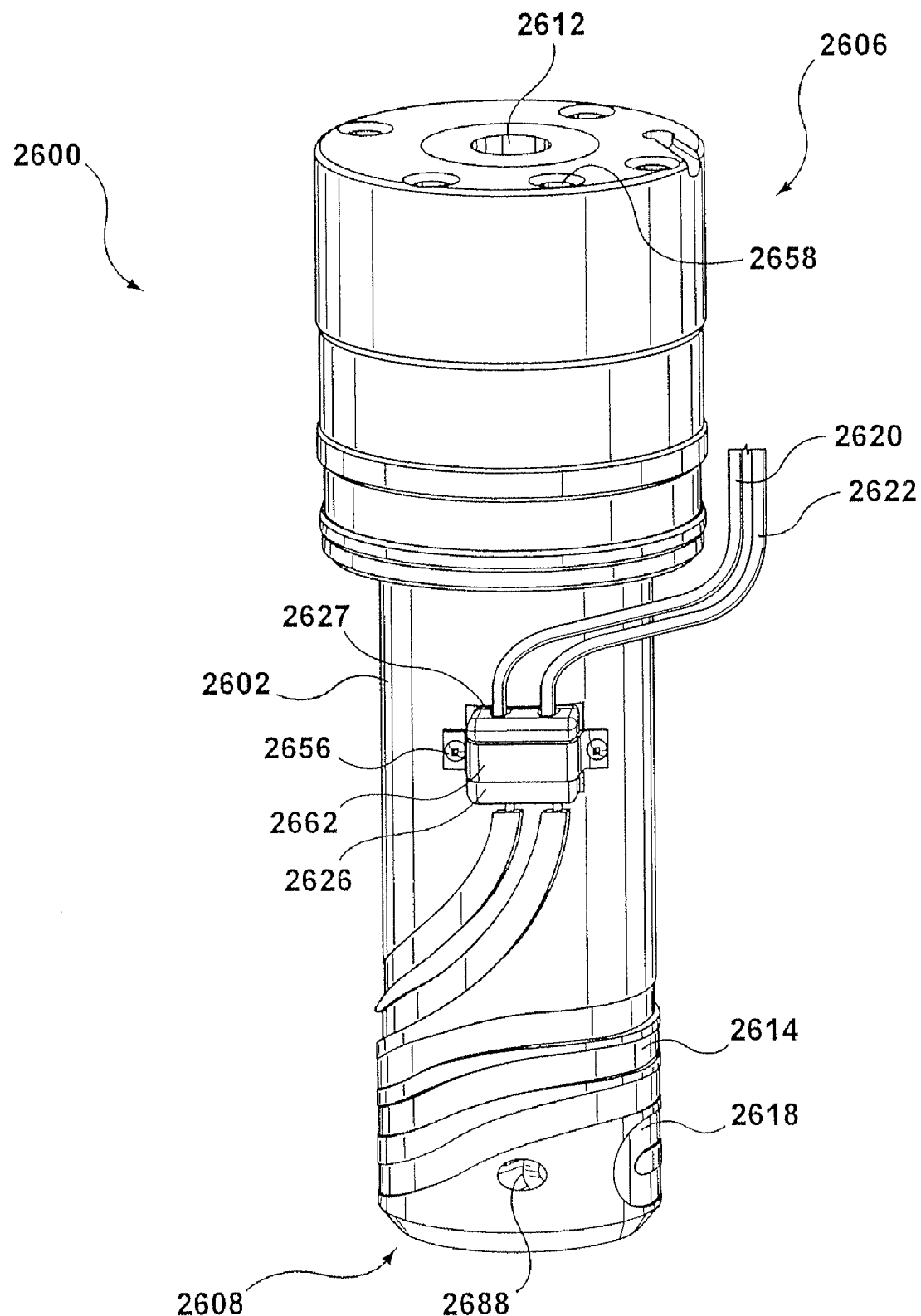
FIG. 26 is a perspective view of an injection molding nozzle having a raised terminal housing according to an embodiment of the invention.

Referring to FIG. 26, an injection molding nozzle according to one embodiment of the invention is shown and designated generally by reference numeral 2600. The nozzle 2600 has a head end 2606 and a tip end 2608, and includes a nozzle body 2602 having a central melt channel 2612 therethrough. The length of the nozzle body 2602 can be said to run in a longitudinal direction. The nozzle 2600 further includes an electrically conductive element in the form of a heater 2614 coupled to, e.g., embedded in, the nozzle body 2602 and extending in a spiral configuration. A thermocouple port 2688 is also provided at the tip end 2608 of the nozzle body 2602 to receive a thermocouple. The heater 2614 comprises a conductive electrical wire, e.g., a resistance heater wire, surrounded by electrical insulation that is covered by a sheath (e.g., a metal sheath). The heater 2614 has a portion 2618 formed into a U-shaped bend and two opposite ends which are electrically coupled to ends of electrical wires of two respective external leads 2620, 2622 within a terminal housing 2626. The terminal housing 2626 is generally tangential to the outer surface of the nozzle body 2602 (or in a plane that is generally parallel to the tangential plane to the outer surface) and sits on an optional flat surface 2627 of the nozzle body 2602. Flat surface 2627 can be provided by a recess or groove in the outer cylindrical surface of the nozzle body. Within the terminal housing 2626, the ends of the resistance heater wire are crimped to the ends of the wires of the leads 2620, 2622 with metal crimping tubes (e.g., tubes 128, 130 of FIG. 2) to form connections. In this embodiment, the terminal housing 2626, the ends of the heater wire, and the ends of the leads are oriented on the nozzle body 2602 such that the ends of the two external leads 2620, 2622 and the ends of the resistance heater wire emerge from the terminal housing 2626 in the longitudinal direction. At the point of connection between the leads and the heater wire, the lead ends and heater wire ends extend in the longitudinal direction and generally parallel to the outer surface of the nozzle body. A fastener 2662, such as bracket or strip made of metal or similar rigid material, holds the terminal housing 2626 to the nozzle body 2602. The fastener 2662 is held in place by bolts or screws 2656. As another option, the terminal housing 2664 can be held to the nozzle body 2602 by an adhesive or by simply the rigidity of the heater 2614 and/or the leads 2620, 2622. A hole 2658 can be provided in the head portion 2606 to accommodate the two external leads 2620, 2622 when space constraints require. A retaining clip (not shown), such as clip 160 of FIG. 2, can also be provided to hold the external leads 2620, 2622 and keep them from becoming tangled or going out of position.

As can be seen in FIG. 26, the terminal housing 2626 extends radially outward with respect to the outer surface of the nozzle body 2602. As such, the heater 2614 can be made to emerge from its groove as it approaches the terminal housing 2626. The groove itself may be made shallower to accommodate this. If the heater 2614 is not in a groove or only partially embedded in a groove, then it does not have to emerge to the same extent from the nozzle body.

Figure 27:
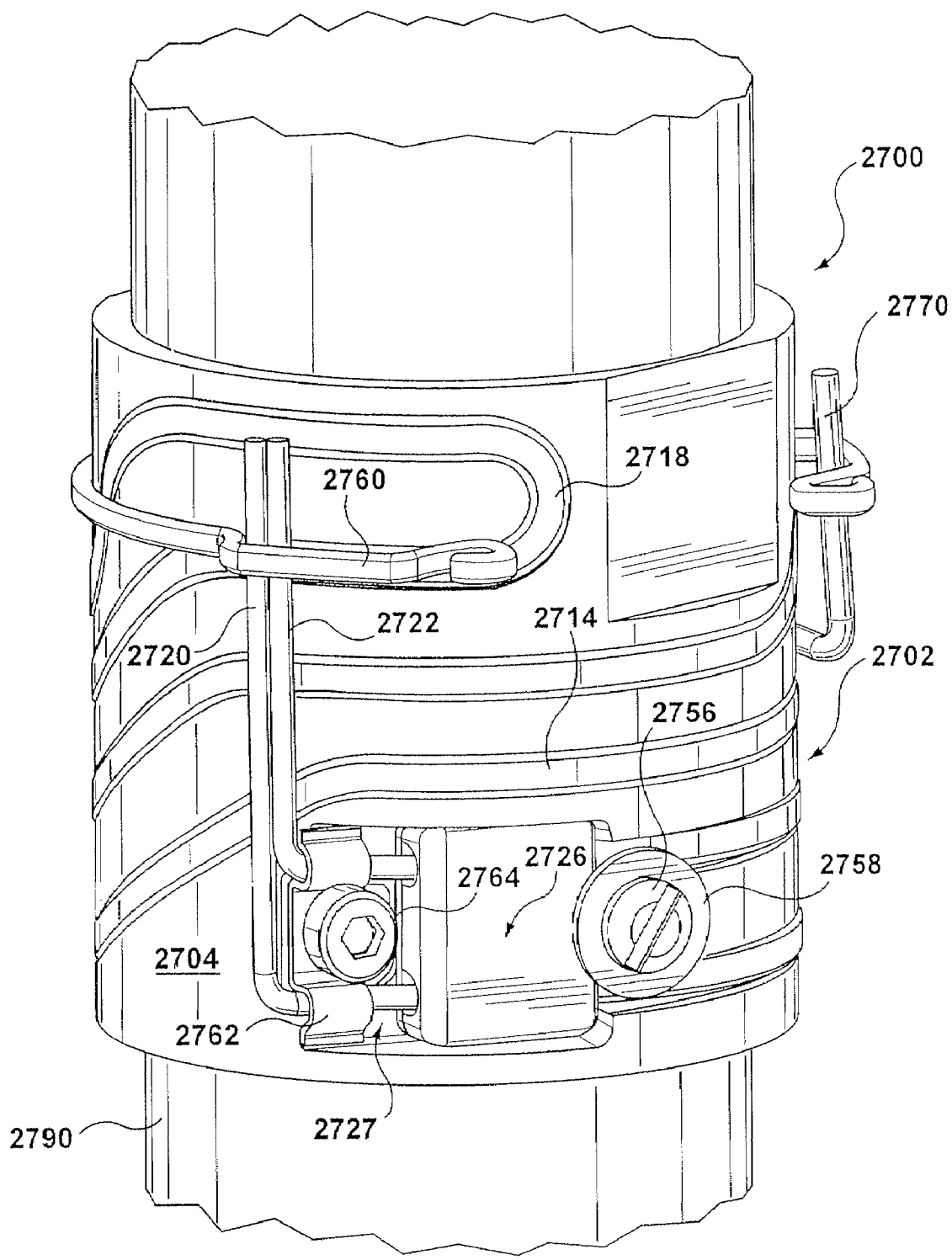
FIG. 27 is a perspective view of a nozzle sleeve having a recessed terminal housing according to an embodiment of the invention.

Referring to FIG. 27, a sleeve according to one embodiment of the invention is shown and designated generally by reference numeral 2700. The sleeve 2700 can be fit around an injection molding nozzle body, generally shown as 2790, in order to provide heat to molding material inside the nozzle body 2790. The sleeve 2700 includes a sleeve body 2702 having an outer surface 2704. The sleeve 2702 may be made of more than one material concentrically arranged for the purpose of thermal clamping (i.e., a bimetallic shrink fit effect) to the nozzle body 2790 and may have a longitudinal slit. The sleeve 2700 can be removable from or permanently fixed to the nozzle body 2790.

The sleeve 2700 further includes an electrically conductive element in the form of a heater 2714 coupled to, e.g., embedded in, the outer surface 2704 and extending in a spiral configuration. The heater 2714 comprises a conductive electrical wire, e.g., a resistance heater wire, surrounded by electrical insulation that is covered by a sheath (e.g., a metal sheath). The heater 2714 has a portion 2718 formed into a U-shaped bend and two opposite ends which are electrically coupled to ends of electrical wires of two respective external leads 2720, 2722 within a terminal housing 2726. The terminal housing 2726 is generally tangential to the outer surface of the sleeve body 2702 (or in a plane that is generally parallel to the tangential plane to the outer surface) and sits in a recess 2727 in the sleeve body 2702. Within the terminal housing 2726, the ends of the resistance heater wire are crimped to the ends of the wires of the leads 2720, 2722 with metal crimping tubes (e.g., tubes 128, 130 of FIG. 2) to form connections. To secure the terminal housing 2726 to the sleeve body 2702 a screw or bolt 2756 and washer 2758 are used, although other methods such as a fastener like that of FIG. 16 or an adhesive can equally be used. Securing the ends of the external leads 2720, 2722 is a fastener 2762 held in place by a screw or bolt 2764, and this may have a washer as well. The fastener 2762 may be omitted, and an adhesive may be used instead. Another option is to have the terminal housing 2726 held to the sleeve body 2702 by simply the rigidity of the heater 2714 and/or the leads 2720, 2722. Further provided is a retaining clip 2760 to hold the external leads 2720, 2722 and a thermocouple wire 2770, and keep them from becoming tangled or going out of position. The retaining clip 2760 may be designed to keep the external leads 2720, 2722 and thermocouple wire 2770 only loosely against the sleeve body 2702, so as to keep heat emitting from the sleeve body 2702 from damaging the external leads 2720, 2722 and thermocouple wire 2770. The sleeve 2700 may also include a projecting rim such as that shown in FIG. 17.

Figure 28:
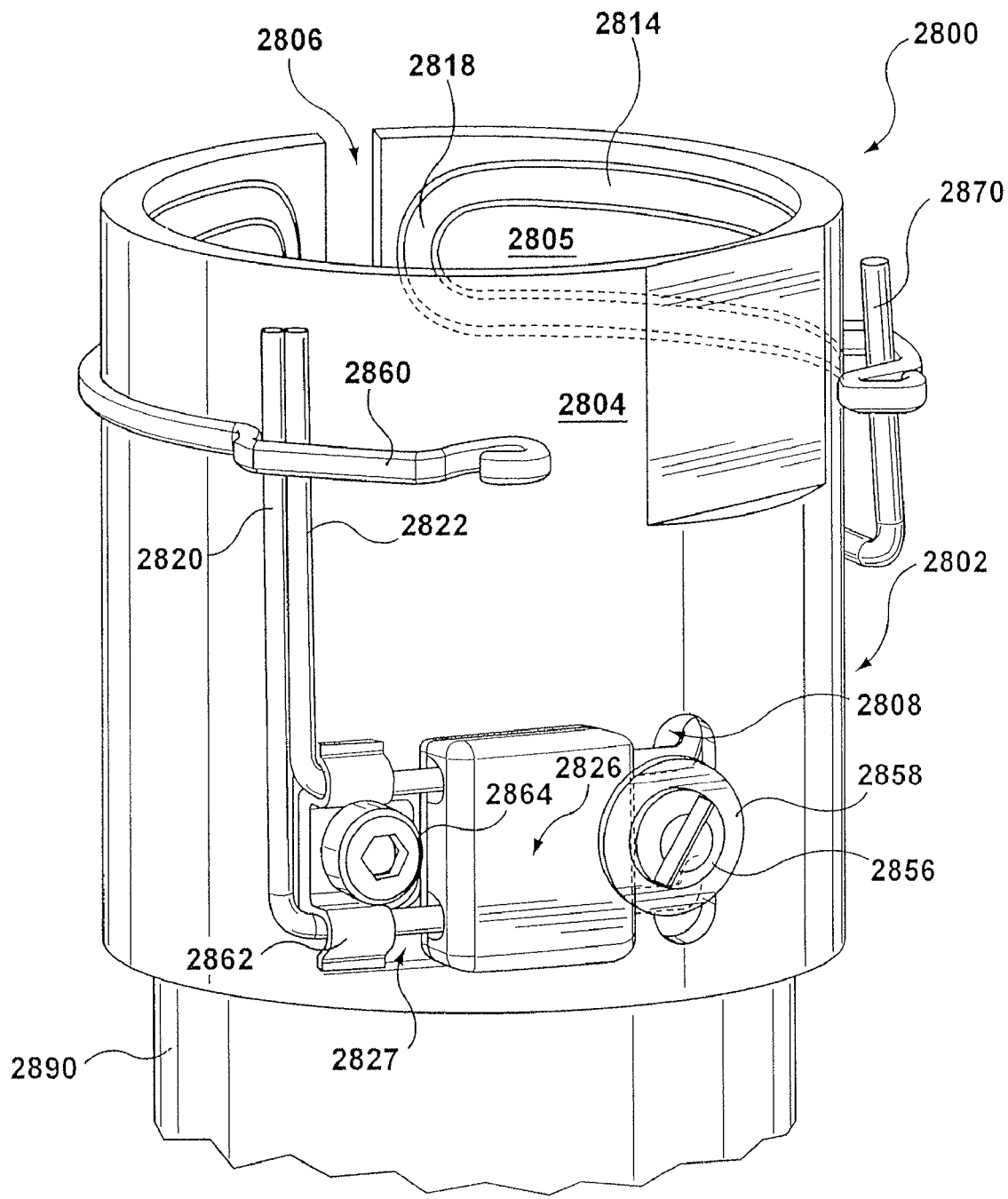
FIG. 28 is a perspective view of a nozzle sleeve having a recessed terminal housing and internal heater according to an embodiment of the invention.

Referring to FIG. 28, a further sleeve according to one embodiment of the invention is shown and designated generally by reference numeral 2800. The sleeve 2800 can be fit around an injection molding nozzle body 2890 (partially shown) in order to provide heat to molding material inside the nozzle body 2890. The sleeve 2800 includes a sleeve body 2802 having an outer surface 2804 and an inner surface 2805. The sleeve 2802 may be made of more than one material concentrically arranged for the purpose of thermal clamping (i.e., a bimetallic shrink fit effect) to the nozzle body 2890, and may also have a longitudinal slit 2806. The sleeve 2800 can be removable from or permanently fixed to the nozzle body 2890.

The sleeve 2800 further includes an electrically conductive element in the form of a heater 2814 coupled to, e.g., embedded in, the inner surface 2805 and extending in a spiral configuration. The heater 2814 comprises a conductive electrical wire, e.g., a resistance heater wire, surrounded by electrical insulation that is covered by a sheath (e.g., a metal sheath). The heater 2814 can have at least one portion 2818 formed into a U-shaped bend and two opposite ends which are electrically coupled to ends of electrical wires of two respective external leads 2820, 2822 within a terminal housing 2826. To allow the heater 2814 to connect to the terminal housing 2826, an opening 2808 can be provided in the sleeve body 2802, although this is not necessary if the terminal housing 2826 is installed on the inner surface 2805. The terminal housing 2826 is generally tangential to the outer surface of the sleeve body 2802 (or in a plane that is generally parallel to the tangential plane to the outer surface) and sits on a flat surface 2827 of the sleeve body 2802. Within the terminal housing 2826, the ends of the resistance heater wire are crimped to the ends of the wires of the leads 2820, 2822 with metal crimping tubes (e.g., tubes 128, 130 of FIG. 2) to form connections. To secure the terminal housing 2826 to the sleeve body 2802 a screw or bolt 2856 and washer 2858 are used, although other methods such as a fastener like that of FIG. 16 or an adhesive can equally be used. Securing the ends of the external leads 2820, 2822 is a fastener 2862 held in place by a screw or bolt 2864, and this may have a washer as well. The fastener 2862 may be omitted, and an adhesive may be used instead. Another option is to have the terminal housing 2826 held to the sleeve body 2802 by simply the rigidity of the heater 2814 and/or the leads 2820, 2822. The sleeve 2800 may also include a retaining clip or projecting rim such as those shown in FIG. 17.

Figure 29:
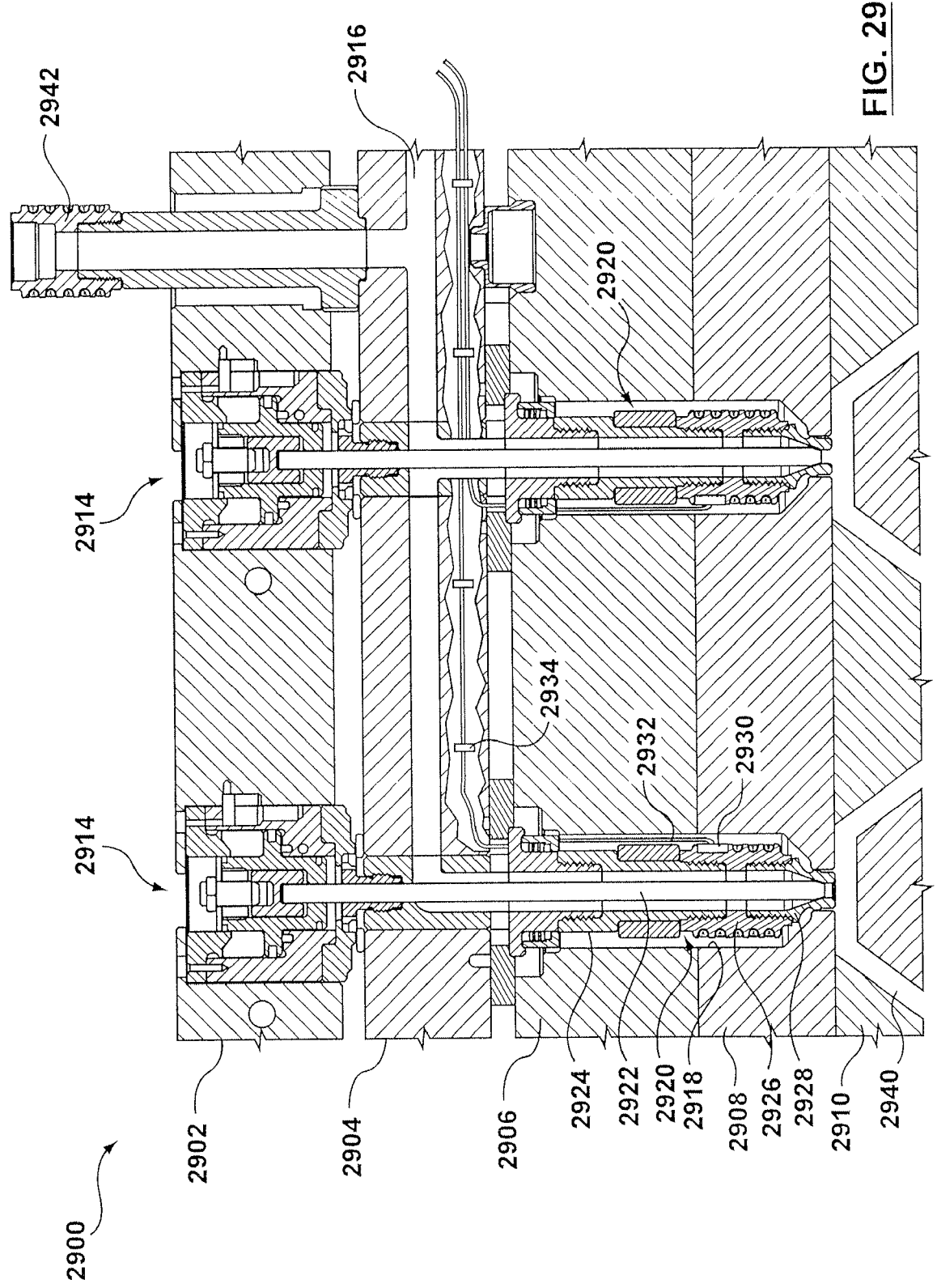
FIG. 29 is a partial sectional view of an injection molding apparatus according to one embodiment of the invention.

FIG. 29 illustrates an injection molding apparatus 2900 according to one embodiment of the invention. FIG. 29 shows how injection molding nozzle segments according to example embodiments of the invention can be used in an injection molding apparatus. The injection molding apparatus 2900 includes mold plates 2902, 2906, 2908; a manifold 2904 (shown in partial section) disposed between the mold plates 2902, 2906; a sprue assembly 2912 for feeding melt to a melt channel 2916 of the manifold 2904; nozzles 2920 connected to the manifold 2904; and a cavity plate 2910 having cavities 2940 that are fed melt by the nozzles 2920. Each nozzle 2920 is disposed in a nozzle well 2918 formed in the plates 2906, 2908, and includes a first segment 2924, a second segment 2926, a tip 2928, and a valve pin 2922. The value pins 2922 are controlled by actuators 2914 disposed in the plate 2902. The first and second segments 2924, 2926 are threaded together, and the tip 2928 is threaded to the second segment 2926. The second segment 2926 comprises a heater, and is similar or identical to any of the injection molding nozzle segments described throughout this disclosure. Power is provided to the second segment 2926 via a terminal housing 2930, which is similar or identical to any of the terminal housings described throughout this disclosure. External electrical leads 2932 are connected to the terminal housing 2930, and the external electrical leads 2932 run inside the nozzle well 2918 up to the manifold 2904, and along the manifold 2904 by way of clips 2934 to an external power supply (not shown) outside the apparatus 2900. Generally, the nozzle 2920 can include as many segments as necessary, heated or unheated. As can be seen in FIG. 29, the terminal housings 2930 allow the orientation of the second segments 2926 to be unrestricted.

The injection molding apparatus 2900 operates as is well known in the art. Appropriate heat is provided to the melt in the nozzles 2920 via electrical heaters that receive electrical power via the terminal housings 2930.

In addition, the sprue assembly 2912 of the injection molding apparatus 2900 can include a heated segment 2942, which is similar or identical to any of the injection molding nozzle segments described throughout this disclosure, so as to provide heat to melt within the sprue assembly 2912.

Figure 30:
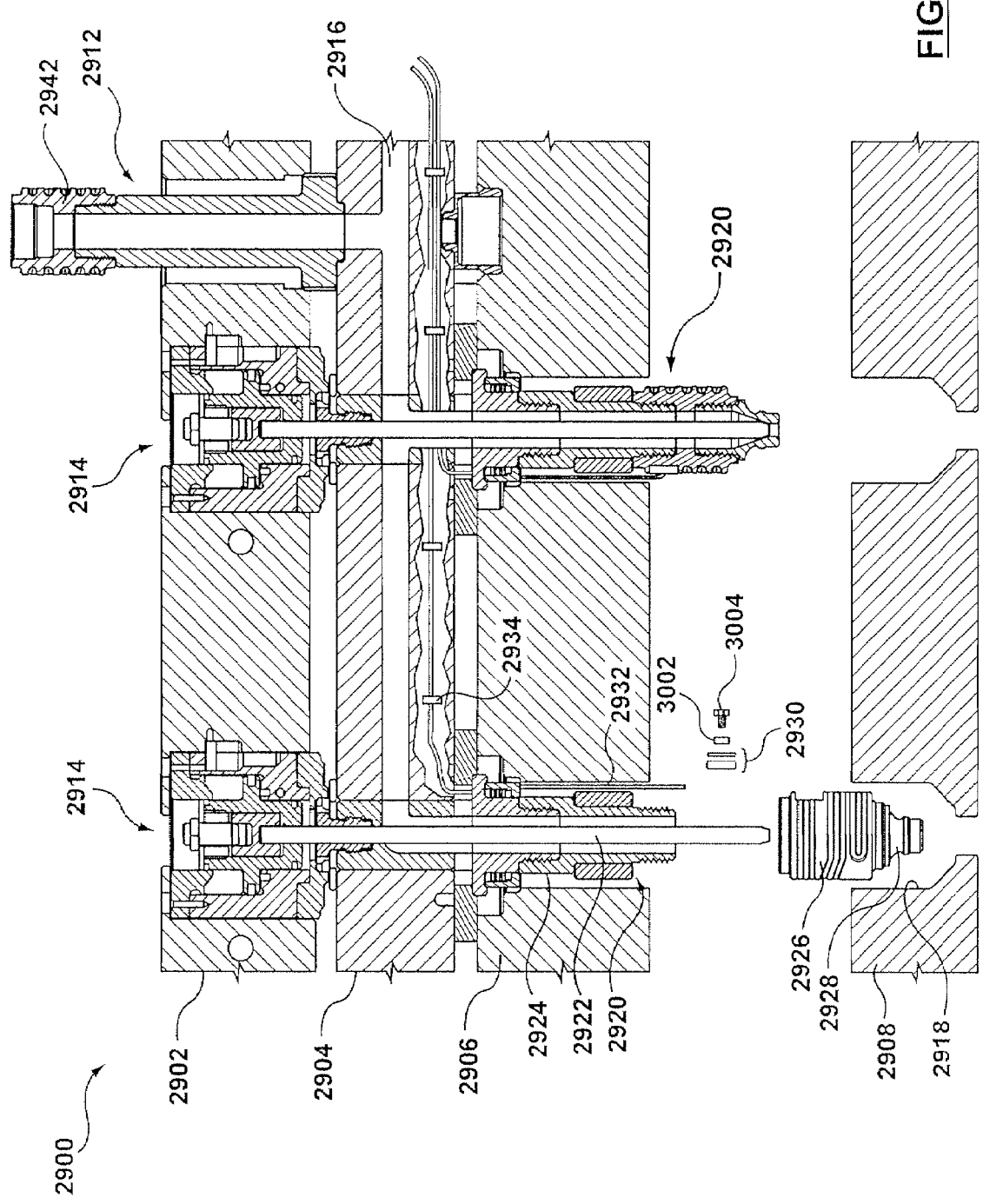
FIG. 30 is a partial sectional view of the injection molding apparatus of FIG. 29 with a plate retracted to allow access to a nozzle segment.

As can be seen in FIG. 30, the injection molding apparatus 2900 allows for front loading of the heated second nozzle segments 2926. The plate 2908 can be retracted from the plate 2906 so that an operator can access the second nozzle segments 2926. To replace a second nozzle segment 2926, say, in case of a heater failure or a change in heating requirements, the operator simply has to detach the terminal housing 2930 from the second nozzle segment 2926 by removing a bracket 3002 and a connecting screw or bolt 3004 (in embodiments where the terminal hosing is secured using a screws and/or brackets), disassemble the terminal housing 2930, and separate the heater wires from the external electrical leads 2932. Separation of the heater wires from the external electrical leads 2932 can be achieved by cutting the connection or removing the crimping tubes. After the heater is disconnected, the second nozzle segment 2926 need only be unthreaded from the first nozzle segment 2924. In this way, the second nozzle segment 2926 can be replaced or refurbished without having to disassemble a more substantial portion of the injection molding apparatus 2900.

In the above embodiments, the terminal housings can be made of a dielectric or electrically insulating material. The electrically insulating material can be a ceramic, such as alumina, or a polymer, such as polyamide or PEEK.

In each of the above embodiments, the terminal housing is mounted to and generally tangential to the outer surface, or in a plane that is generally parallel to the tangential plane to the outer surface, of the cylindrical nozzle component. Within the terminal housing, the ends of the external leads and the heater wire extend substantially perpendicular to the radius of the nozzle component at the point where the terminal housing is located. In other words, at the point of their connection within the terminal housing, the ends of the external leads and the heater wire extend either in a plane that is generally tangential to the outer surface of the nozzle component, or in a plane that is generally parallel to the plane that is tangential to the outer surface of the nozzle component. It will appreciated that in actual practice the plane in which the terminal housing and terminal connection extend relative to the nozzle component may not be perfectly parallel to the tangential plane at the point on the outer surface of the nozzle component where the terminal housing is located, hence the reference herein to the phrase "generally tangential" or "generally parallel". In some embodiments, the connection/housing may extend in a plane that has an intersection range of plus/minus 30° degrees with a plane that is tangential to the outer surface of the body of the nozzle component. In some embodiments, the, the connection/housing may extend in a plane that has an intersection range of plus/minus 10° degrees with a plane that is tangential to the outer surface of the body of the nozzle component. The embodiments described herein can reduce the overall diameter of a nozzle, nozzle segment, or sleeve having the terminal housing. Compared to conventional radial terminal housings which tend to protrude radially from the head end of the nozzle, the tangential terminal housing and connection described above can in some configurations reduce the need for manifold slots or larger diameter wells that might otherwise be required to accommodate the larger radial terminal housings. Moreover, the nozzle, nozzle segment, or sleeve incorporating the tangential terminal housings and connections described herein can become more symmetrical, meaning that the orientation of such is less of a concern. The external leads, if suitably flexible, can be maneuvered to outside the hot-runner via any convenient path, resulting in the installed orientation the nozzle, nozzle segment, or sleeve being less critical.

In the afore-described embodiments, the electrically conductive element comprises of a resistance heater wire of a heater or a wire connected to thermocouple. However, it can also comprise a wire of a sensor for determining any other injection molding condition such as a pressure sensor or position sensor. The present invention is applicable to any terminal of an injection molding nozzle and is not restricted to terminals for heater elements or thermocouples. In the above description and in the Figures, various terminal housing and connection configurations have been described in the context of different types of nozzle components. For example, various terminal housing and connection configurations have been described in the context of nozzle segments used in modular injection molding nozzles (see for example the nozzle segments of FIGS. 2, 6, 17, 18, 21, 24), various terminal housing and connection configurations have been described in the context of non-modular injection molding nozzles (see for example the nozzles of FIGS. 14, 15, and 26), and various terminal housing and connection configurations have been described in the context of sleeves that can be mounted on nozzle segments or nozzle bodies (see for example the sleeves of FIGS. 27 and 28). It will be appreciated that the terminal housing and connection configurations that have been described above in the context of nozzle segments can also be applied to non-modular nozzles and to nozzle sleeves, that the terminal housing and connection configurations that have been described in the context of non-modular nozzles can also be applied to modular nozzles segments and to nozzle sleeves, and that the terminal housing and connection configurations that have been described above in the context of nozzle sleeves can also be applied to modular nozzles segments and to non-modular nozzles. Furthermore, the terminal housing and connection configurations described above can also be applied to other injection molding components, such as a hot-runner sprue assembly (for example for a heater embedded or secured to sprue bushing 20 of FIG. 1).

In example embodiments described above, an electrical and physical connection is formed between an external lead and a wire (for example a heating wire) carried by the nozzle component is made through the use of a crimping tube that is housed within the terminal housing. Other types of connections could be used instead of or in addition to a crimping tube, including soldering for example.

In the example embodiments described above, the various runner nozzle segments, nozzles and sleeves to which the various embodiments of low profile terminal connections have been applied have had a cylindrical outer surface. However, the various embodiments of the low profile terminal connections described above could also be applied to other injection molding components (such as nozzle segments, nozzles, nozzle sleeves and sprue assemblies) that are tubular or hollow so as to define a central passage, and which are not perfectly cylindrical. For example, the terminal housing and connection embodiments described above could be applied to components having a non-circular cross section such as an elliptical or other type of curved surface, or even multi-sided components such as components having a hexagonal outer surface for example.

The foregoing description has been provided by way of example only and shall not be construed to limit the scope of the invention as defined by the following claims.

The invention claimed is:

1. An injection molding hot-runner component comprising:
   a tubular body defining a central passage and having an outer surface;
   an electrically insulated heater wire coupled to the tubular body;
   an external lead electrically connected to an end of the heater wire to form a connection, the external lead for connecting to an external power supply; and
   a terminal housing mounted to the outer surface of the tubular body, the connection of the external lead and the end of the heater wire being located within the terminal housing, wherein the connection extends in a plane that is generally parallel to a tangential plane to the outer surface of the tubular body at the location of the connection.

2. The injection molding hot-runner component of claim 1, wherein the heater wire comprises a U-shaped bend, and wherein the injection molding hot-runner component further comprises another external lead that connects to another end of the heater wire to form another connection, the other connection being located within the terminal housing and extending in a plane that is generally parallel to a tangential plane to the outer surface of the tubular body at the location of the connection.

3. The injection molding hot-runner component of claim 1, wherein the heater wire comprises a U-shaped bend, and wherein the injection molding hot-runner component further comprises another external lead that connects to another end of the heater wire to form another connection, and another terminal housing mounted to the outer surface of the tubular body, the another connection of the external lead and the another end of the heater wire being located within the another terminal housing, wherein the another connection extends in a plane that is generally parallel to a tangential plane to the outer surface of the tubular body at the location of the connection.

4. The injection molding hot-runner component of claim 1 wherein the tubular body is a cylindrical body and the outer surface is a cylindrical outer surface.

5. The injection molding hot-runner component of claim 4, wherein the connection of the external lead and the end of the heater wire extends in a line that is parallel to a line tangential to the outer surface of the tubular body.

6. The injection molding hot-runner component of claim 4, wherein the connection of the external lead and the end of the heater wire is generally parallel to the outer surface of the tubular body.

7. The injection molding hot-runner component of claims 1, wherein the terminal housing comprises two pieces that are joined to form a rectangular box-like structure, with one of the pieces being located between the connection and the outer surface.

8. The injection molding hot-runner component of any claims 1, wherein the terminal housing has a tubular shape defining an interior passage in which the connection is located.

9. The injection molding hot-runner component of claim 1, wherein the terminal housing comprises ceramic material or polymer material.

10. The injection molding hot-runner component of claim 1 further comprising a fastener or an adhesive that fixes the terminal housing to the tubular body.

11. The injection molding hot-runner component of claim 1, wherein the terminal housing is held adjacent to the tubular body by rigidity of at least one of the heater wire or the external lead.

12. The injection molding hot-runner component of claim 1, wherein the outer surface of the tubular body is curved, and the terminal housing comprises an inner curved surface that mates with the curved outer surface of the tubular body.

13. The injection molding hot-runner component of claim 1, wherein the tubular body comprises a recessed seat on the outer surface in which the terminal housing is at least partially disposed.

14. The injection molding hot-runner component of claim 1, wherein the tubular body comprises a flat surface on the outer surface on which a flat surface of the terminal housing is positioned.

15. The injection molding hot-runner component of claim 1 further comprising a fastener that fixes the external lead and the terminal housing to the tubular body.

16. The injection molding hot-runner component of claim 1 further comprising a retaining clip that clips onto the tubular body and holds the external lead to the tubular body.

17. The injection molding hot-runner component of claim 1 further comprising a rim projecting from the tubular body and extending further from a central axis of the tubular body than the terminal housing extends from the central axis.

18. The injection molding hot-runner component of claim 1 further comprising a crimping tube that connects the heater wire to the external lead to form the connection.

19. The injection molding hot-runner component of claim 1 wherein the tubular body is part of a hot-runner nozzle segment for forming a hot-runner nozzle that is for connecting to a manifold to deliver melt to a mold cavity.

20. The injection molding hot-runner component of claim 1, wherein the tubular body is part of a hot-runner nozzle body for connecting to a manifold to deliver melt to a mold cavity.

21. The injection molding hot-runner component of claim 1, wherein the tubular body is part of a sleeve for disposing over a hot-runner nozzle or nozzle segment.

22. The injection molding hot-runner component of claim 21, wherein the tubular body comprises a longitudinal slit extending between the outer surface and the central passage.

23. The injection molding hot-runner component of claim 1, wherein the tubular body is part of a hot-runner sprue assembly.

24. The injection molding hot-runner component of claim 1, wherein the heater wire is wrapped around the tubular body.

25. The injection molding hot-runner component of claim 1, wherein the heater wire is at least partially embedded in the outer surface of the tubular body.

26. The injection molding hot-runner component of claim 1, wherein the heater wire is wrapped inside the tubular body.

27. The injection molding hot-runner component of claim 26, wherein the heater wire is at least partially embedded in an inner surface of the tubular body.

28. The injection molding hot-runner component of claim 27, wherein the terminal housing is disposed on the outer surface of the tubular body and the tubular body comprises a hole allowing the heater wire to extend from the outer surface to the inner surface.

29. The injection molding hot-runner component of claim 1 further comprising a metal sheath that surrounds the electrically insulated heater wire.

30. The injection molding hot-runner component of claim 1 wherein the connection of the external lead and the end of the heater wire extends in a plane having an intersection angle range of between −30° to +30° with a tangential plane to the outer surface of the tubular body at the location of the connection.

31. The injection molding hot-runner component of claim 1 wherein the connection of the external lead and the end of the heater wire extends in a plane having an intersection angle range of between −10° to +10° with a tangential plane to the outer surface of the tubular body at the location of the connection.

32. An injection molding hot-runner apparatus comprising:
a manifold having a manifold melt channel therein;
a nozzle connected to the manifold, the nozzle comprising a nozzle body having an outer surface and a nozzle melt channel therethrough, the nozzle melt channel in communication with the manifold melt channel;
an electrically insulated heater wire coupled to the nozzle;
an external lead electrically connected to one end of the heater wire and another external lead electrically connected to another end of the heater wire forming connections, the external leads for connecting to an external power supply; and
an electrically insulating terminal housing connected to the outer surface of the nozzle body, at least one of the connections of the external leads and the ends of the heater wire being located within the terminal housing, wherein the at least one connection extends in a plane generally parallel to a tangential plane to the outer surface of the nozzle body at the location of the connection.

33. The injection molding hot-runner apparatus of claim 32 wherein the other of the connections of the external leads and the ends of the heater wire is also located within the terminal housing and the other connection extends in a plane that is generally parallel to a tangential plane to the outer surface of the nozzle body at the location of the connection.

34. The injection molding hot-runner apparatus of claim 32 further comprising at least a clip connected to the manifold, the clip for holding the external leads to the manifold.

35. The injection molding hot-runner apparatus of claim 32, wherein the terminal housing is fixed to the nozzle body.

36. The injection molding hot-runner apparatus of claims 32, wherein the heater wire is wrapped around the nozzle body and at least partially embedded in the outer surface of the nozzle body.

37. The injection molding hot-runner apparatus of claim 32 further comprising a sleeve around which the heater wire is wrapped, the sleeve disposed on the nozzle body.

38. The injection molding hot-runner apparatus of claim 32 wherein the connection of the external lead and the end of the heater wire extends in a plane having an intersection angle range of between −30° to +30° with a tangential plane to the outer surface of the nozzle body at the location of the connection.

39. The injection molding hot-runner apparatus of claim 32 wherein the connection of the external lead and the end of the heater wire extends in a plane having an intersection angle range of between −10° to +10° with a tangential plane to the outer surface of the nozzle body at the location of the connection.

40. An injection molding hot-runner nozzle component comprising:
   a tubular body defining a central passage and having an outer surface;
   an electrically insulated heater wire coupled to the tubular body;
   an external lead for connecting to an external power supply, the external lead having a lead end connected to an end of the heater wire; and
   an insulating terminal housing tangentially mounted to the outer surface of the tubular body, the connection of the lead end and the end of the heater wire being located within the terminal housing, wherein the tubular body outer surface is substantially cylindrical with a recessed seat formed therein in which the terminal housing is at least partially received.

41. The nozzle component of claim 40 wherein the nozzle component is one of a nozzle segment for use in a multi-segment nozzle, a nozzle, or a nozzle sleeve for mounting on a nozzle segment or nozzle.

* * * * *